United States Patent
Thiruchengode Vajravel et al.

(10) Patent No.: US 12,517,845 B2
(45) Date of Patent: Jan. 6, 2026

(54) SYSTEM AND METHOD FOR ADAPTIVE CONFIGURATION AND FIRMWARE UPDATE OWNERSHIP ACROSS NODES OF A PERIPHERAL DEVICE WORKSPACE BASED ON REAL-TIME ASSESSMENT OF NODE CAPABILITIES AND CAPACITY

(71) Applicant: Dell Products, LP, Round Rock, TX (US)

(72) Inventors: Gokul Thiruchengode Vajravel, Bangalore (IN); Srinivasa Ragavan Rajagopalan, Bangalore (IN); Vivek Viswanathan Iyer, Saint Johns, FL (US)

(73) Assignee: DELL PRODUCTS LP, Round Rock, TX (US)

( * ) Notice: Subject to any disclaimer, the term of this patent is extended or adjusted under 35 U.S.C. 154(b) by 0 days.

(21) Appl. No.: 18/429,986

(22) Filed: Feb. 1, 2024

(65) Prior Publication Data
US 2025/0252061 A1 Aug. 7, 2025

(51) Int. Cl.
*G06F 13/10* (2006.01)
*G06F 8/65* (2018.01)

(52) U.S. Cl.
CPC .............. *G06F 13/102* (2013.01); *G06F 8/65* (2013.01); *G06F 2213/40* (2013.01)

(58) Field of Classification Search
None
See application file for complete search history.

(56) References Cited

U.S. PATENT DOCUMENTS

| | | | |
|---|---|---|---|
| 9,003,311 B2 | 4/2015 | Reeves | |
| 10,057,131 B1 | 8/2018 | Brown | |
| 10,606,725 B2 | 3/2020 | Hanson | |
| 11,321,247 B2 | 5/2022 | Bshara | |
| 2013/0326465 A1* | 12/2013 | Jain | G06F 8/77 717/100 |
| 2019/0179645 A1 | 6/2019 | Prasad | |
| 2020/0015300 A1 | 1/2020 | Suumaki | |
| 2024/0267400 A1* | 8/2024 | Gazit | H04L 63/1433 |

* cited by examiner

*Primary Examiner* — Scott C Sun
(74) *Attorney, Agent, or Firm* — Prol Intellectual Property Law, PLLC; H. Kenneth Prol

(57) ABSTRACT

A peripheral device workspace cloud orchestrator information handling system comprises a network interface device to receive maximum and current hardware resource availabilities and for a first anchor information handling system node and other peripheral device nodes operatively coupled at an identified location to form a defined peripheral device workspace that also includes a second information handling system node or a smart peripheral device node, and a hardware processor to execute code instructions to determine a ranking score for the first and second information handling systems, and smart peripheral device, based on the maximum and current hardware resource availabilities to determine which one of the second information handling system or the smart peripheral device associated with a highest ranking score is to transition to implement transmitted peripheral device operational configuration policies or firmware or software updates at each of the plurality of peripheral devices.

20 Claims, 4 Drawing Sheets

SYSTEM AND METHOD FOR ADAPTIVE CONFIGURATION AND FIRMWARE UPDATE OWNERSHIP ACROSS NODES OF A PERIPHERAL DEVICE WORKSPACE BASED ON REAL-TIME ASSESSMENT OF NODE CAPABILITIES AND CAPACITY

FIELD OF THE DISCLOSURE

The present disclosure generally relates to automatic assessment, configuration, and firmware updating for peripheral devices for use in a peripheral device workspace. The present disclosure more specifically relates to dynamically or adaptively assigning ownership of firmware or software updates and peripheral device operational configuration policy application execution across a plurality of smart peripheral devices and information handling systems, each comprising nodes of a peripheral device workspace, based on periodically gathered capabilities, workloads, and hardware capacities for each of the nodes.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities. The information handling system may be operatively coupled to one or more wireless peripheral input/output devices such as a keyboard, mouse, touchpad, gaming controller, docking station, display device, wearable peripheral device, speakers, earbud, headphone, microphone, stylus, or other peripheral devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
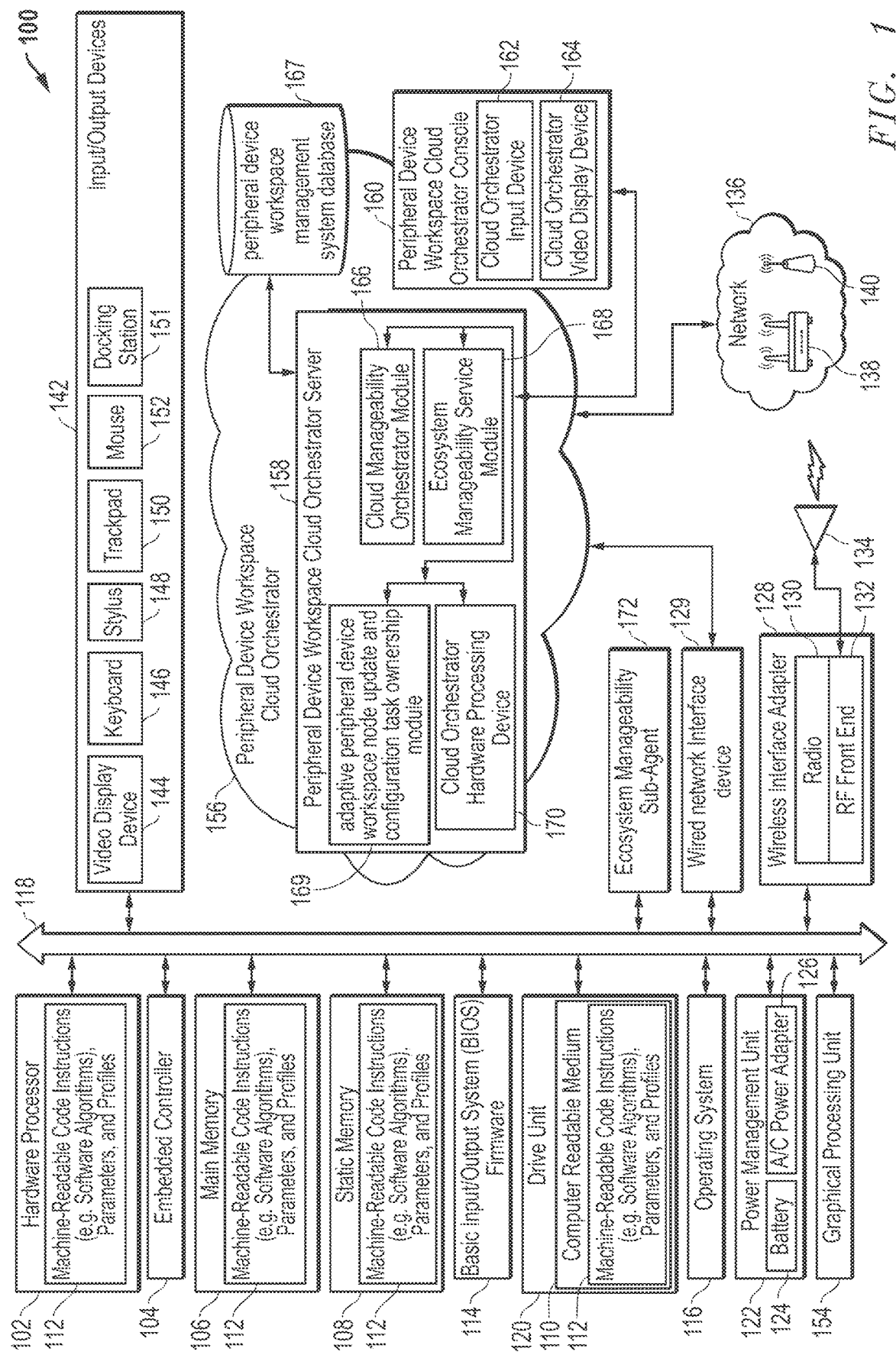
FIG. 1 is a block diagram illustrating a cloud-based information handling system executing code instructions of a peripheral device workspace cloud orchestrator to orchestrate configuration of peripheral devices across a plurality of peripheral device workspaces according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A user may oftentimes use an information handling system in a peripheral device workspace. In this context, a peripheral device workspace can be defined and established with a peripheral device workspace identification value in memory as a location with a manifest of nodes that includes a user information handling system (e.g., a laptop) or a smart peripheral device as an anchor node and secondary peripheral device nodes that are connected to the user information handling system or smart peripheral device anchor node. Some peripheral device workspaces may include multiple information handling systems, or additionally include smart peripheral devices having some compute capacity and network interface capacity. Peripheral device operational telemetry readings may be included with a peripheral device workspace under a peripheral device workspace identification value and include for example, time of day, applications being executed, wireless or wired connection capabilities of nodes, hardware component usage metrics of the anchor node user information handling system, security credentials for the user, and other workspace data. Peripheral devices may commonly include internal or external devices such as displays, a keyboard, a mouse, a webcam, a printer, a speaker, a fingerprint scanner, etc. A peripheral device workspace may include a wired or wireless dock by which the user information handling system connects to some or all the peripheral devices including smart peripheral devices having some compute, input/output or network capabilities.

A peripheral device workspace may oftentimes be used for hybrid work scenarios. For example, a business may have an office space that includes hoteling cubes that can be assigned to, reserved by, or otherwise utilized by a plurality of business's employees as peripheral device workspaces. In such cases, the business may allow its employees to connect their laptops to a dock in a particular hoteling cube where various peripherals may be available for use. Users may also employ peripheral device workspaces when working from home or other locations. Some peripheral device workspaces may be personal, shared with other users, or collaborative in various embodiments.

When a user employs multiple peripheral device workspaces (e.g., by connecting a laptop to different combinations of peripherals during a workday), it can be tedious for the user to configure the peripheral device workspaces to his or her preferences. Those multiple peripheral device workspaces may be associated with a user under a user composite peripheral device workspace identifier and include an identification of the user. In an example embodiment, while using one peripheral device workspace, the user may set configurations for the peripherals of the peripheral device workspace to match the user's preferences. If the user switches to a different peripheral device workspace, those configurations may not be consistent with the peripherals of the different peripheral device workspace or may result in unintended changes. The user may therefore have to manually reconfigure the peripheral device workspace.

Execution of code instructions for an ecosystem manageability sub-agent on a user information handling system monitors for sets of peripheral device operational telemetry readings of a peripheral device workspace, such as time, applications currently executing or planned, hardware component usage metrics, connection type (e.g., wireless, wired, wireless wide area network (WWAN), wireless local area network (WLAN), wireless private area network (WPAN)), security credentials for the user, or environmental sensor readings (e.g., humidity, temperature), among other possible peripheral device operational telemetry readings for the information handling system node and peripheral device nodes in a peripheral device workspace. These peripheral device operational telemetry readings associated with a peripheral device workspace identification value may be gathered routinely in telemetry measurements, or upon each startup of an anchor node information handling system, for example. The ecosystem manageability sub-agent executing at the information handling system in a peripheral device workspace may create a manifest of peripheral device nodes and other nodes for a peripheral device workspace identification value to represent the current peripheral device workspace, including an identification of the user, and an identification (e.g., by product serial number or other peripheral device identification) of each of the peripheral device nodes connected to or operably coupled to the anchor information handling system at a peripheral device workspace.

Each peripheral device and information handling system within a peripheral device workspace may be associated with an orchestrated device descriptor (ODD) which includes a description of all non-configurable aspects of the peripheral device or information handling system, such as a list of performance capabilities for any central processing unit (CPU), various types of memory, any networking capabilities, and various types of storage. The performance capabilities within an ODD for a given device may be listed within performance specifications for that device, as developed and distributed by the peripheral device or information handling system manufacturer. In an embodiment, the ODD for a given device node may include details of maximum or best performance capabilities for particular components that may be included such as hardware processing resources, memory resources, network connectivity resources, camera systems, resolution levels, sampling or polling rates, or the like.

The hardware processor of an information handling system currently acting as an anchor node for a peripheral device workspace may execute code instructions of the ecosystem manageability sub-agent to also collect one or more peripheral device operational telemetry readings (e.g., time, applications executing, hardware component usage metrics, or other telemetry data indicating usage patterns for the information handling system in a peripheral device workspace), and one or more peripheral device configuration settings (e.g., resolution for an external display device) for the operably coupled peripheral devices. The manifest of peripheral device nodes and other nodes as well as location of a peripheral device workspace described above may be combined with the orchestrated device descriptors, peripheral device operational telemetry readings for the peripheral device workspace and an identification of the anchor node information handling system user into a peripheral device workspace anchor node status update document written in a machine-readable language or machine markup language such as JavaScript Object Notation (JSON), for example. This peripheral device workspace anchor node status update may be transmitted for storage with the peripheral device workspace identification value at a peripheral device workspace management system database operating in a cloud computing platform. Each time a peripheral device configuration setting is changed by the user, a new peripheral device is added to the peripheral device workspace, or changes to peripheral device operational telemetry readings for the peripheral device workspace are detected, a new peripheral device workspace anchor node status update document including this updated configuration may be transmitted to an adaptive peripheral device workspace node update and configuration task ownership module executing at a peripheral device workspace cloud orchestration server with the peripheral device workspace management system.

Various peripheral device workspaces such as the hybrid work office peripheral device workspaces and other peripheral device workspaces described herein may be defined by location indicator detected for an anchor node information handling system operating at the peripheral device workspace, and a manifest of nodes of peripheral devices and smart devices that may operate in the peripheral device workspace. Each such defined peripheral device workspace may also be assigned a peripheral device workspace identification value which may be stored and associated with stored manifests of nodes operating in the peripheral device workspace. An Information Technology Decision Maker (ITDM) for an enterprise or particular peripheral device workspaces may select one or more smart peripheral devices or information handling systems within each peripheral device workspace under their management as capable or incapable of ownership for certain background tasks, such as installation and application of firmware or software updates or configuration policies at each of the peripheral devices and information handling systems within the peripheral device workspace. Additional orchestrated device descriptors or peripheral device operational telemetry readings for the peripheral device workspace may be stored within one or more peripheral device workspace anchor node status update documents as well as included in the definition of the peripheral device workspace and associated with its peripheral device workspace identification value defined at the peripheral device workspace cloud orchestrator server database. Such peripheral device operational telemetry readings may include peripheral device node and information handling system node capabilities, connectivity details, hardware component capacities, current configurations or settings, setting or configuration options, current versions of firmware, and other features of nodes within the peripheral device workspace. For example, the definition of the peripheral device workspace associated with a specific peripheral device workspace identification value may include a set of peripheral device operational telemetry readings stored within one or more peripheral device workspace anchor node status update documents, such as time, applications currently executing or planned, connection type, hardware component capabilities or usage metrics, or environmental sensor readings (e.g., humidity, temperature), among other possible peripheral device operational telemetry readings for an anchor node information handling system operating within the defined peripheral device workspace.

A peripheral device workspace may be defined by a location, a list of peripheral devices operatively coupled to an anchor node information handling system for a user, and additionally in some cases, by one or more of the peripheral device operational telemetry readings for the peripheral device workspace described herein. Each of these defining factors may be associated in memory database of the peripheral device workspace management system with the peripheral device workspace identification value, which may also be associated with one or more peripheral device operational configuration policies describing how the peripheral device nodes within the defined peripheral device workspace are to operate by execution of one or more software modules of a peripheral device workspace cloud orchestrator. Thus, a particular peripheral device operational configuration policy for one or more peripheral devices within a given peripheral device workspace having a peripheral device workspace identification value may apply only when certain peripheral device operational telemetry readings, such as telemetries describing usage patterns for those peripheral devices are detected. In such a way, the peripheral device operational configuration policy generated by execution of one or more software modules of a peripheral device workspace cloud orchestrator for a peripheral device node within a peripheral device workspace may be defined or associated with particularly defined usage patterns for that peripheral device. For example, a peripheral device operational configuration policy may apply only when certain software applications are executing at the anchor node information handling system defined within the peripheral device workspace, or when one or more hardware components' (e.g., graphics processing unit (GPU), central processing unit (CPU), memory) usage metrics or connectivity metrics meet a predefined threshold.

Because these usage patterns may change frequently, peripheral device operational configuration policies may also need to be updated frequently to account for these changes in usage patterns. In addition, firmware at one or more of the peripheral devices or information handling systems within a given peripheral device workspace may need to be routinely updated. Peripheral device workspaces that include a plurality of information handling systems or one or more smart peripheral devices having some compute and network capabilities may be capable of delegating some of these frequent update tasks away from information handling systems undergoing high workloads and toward underutilized information handling systems or smart peripheral devices defined within the peripheral device workspace as capable of such task execution.

Code instructions for the adaptive peripheral device workspace node update and configuration task ownership module executing on peripheral device workspace cloud orchestrator server in embodiments herein may execute to determine a peripheral device update task delegation ranking score for each information handling system node or smart peripheral device node in a given peripheral device workspace. These peripheral device update task delegation ranking scores for each smart node may be used to adaptively shift update tasks for firmware and peripheral device configurations to the most capable and least utilized smart node within the peripheral device workspace as peripheral device operational telemetry readings change. Such a peripheral device update task delegation ranking score for a smart node in a peripheral device workspace may include for example, a ranking of each device by capabilities, as taken from the orchestrated device descriptors, a rating of currently available capacity for hardware components such as processors, memory, storage, and network interface devices, and a rating of ITDM-assigned ownership capabilities. In an example embodiment, the peripheral device update task delegation ranking score for a smart node in a peripheral device workspace may include for example, a ranking of each device by maximum or best capabilities of hardware components of smart nodes. Code instructions for the adaptive peripheral device workspace node update and configuration task ownership module may then execute to rank each of the smart nodes (e.g., smart peripheral devices and information handling systems) within a given peripheral device workspace from first to last choice to execute firmware or software updates and institute peripheral device configuration policies across the peripheral devices within the peripheral device workspace. In some cases, the ranking of smart nodes selected to execute firmware or software updates for all peripheral devices within the peripheral device workspace may be separate and distinct from the ranking of smart nodes selected to execute updates to configuration policies for each of the peripheral devices within the peripheral device workspace.

Execution of code instructions for the adaptive peripheral device workspace node update and configuration task ownership module in embodiments may operate to dynamically or adaptively assign ownership of firmware or software updates and peripheral device operational configuration policy updates across a plurality of smart nodes of a peripheral device workspace, based on periodically gathered capabilities, workloads, and hardware capacities or utilization levels for each of the nodes in order to avoid overloading a smart node experiencing a high workload exceeding a utilization threshold level. The adaptive peripheral device workspace node update and configuration task ownership module in embodiments may periodically receive peripheral device workspace anchor node status update documents describing the current hardware component usage, battery remaining, and identification of newly added or recently removed nodes, for example. Code instructions for the adaptive peripheral device workspace node update and configuration task ownership module may execute to re-delegate update tasks across smart nodes for the peripheral device workspace in embodiments if a recently received peripheral device workspace anchor node status update document contains one or more triggers such as an indication of execution of a resource-intensive software application being scheduled to execute or executing or a resource level reaching or exceeding a resource level threshold. For example, such triggers may include an identification that a resource usage metric for a hardware component such as a CPU, memory, storage device, or network interface device exceeds a resource level threshold value (e.g., 90%) for one or more of the smart nodes within the peripheral device workspace identified by the ITDM as capable of update ownership. Other example triggers may include low battery power remaining or entry or removal of a smart node within the peripheral device workspace. Yet other triggers may include indication of a scheduled resource-intensive execution of an application, update, or the like or an indication of current execution of the same.

Upon identification of one of these triggers in embodiments described herein, code instructions for the adaptive peripheral device workspace node update and configuration task ownership module may execute to reevaluate which smart node should be assigned as the anchor node for the peripheral device workspace. In the case where the trigger identified above involves an identification of low availability of a hardware component (e.g., CPU, memory, storage device, network interface device, battery) due to approaching or reaching a resource level threshold for a given smart node within the peripheral device workspace, that smart node may be de-designated as the anchor node or removed from consideration as the anchor node for the peripheral device workspace until the resource utilization level returns to a lower level or falls below a second lower resource level threshold. Code instructions for the adaptive peripheral device workspace node update and configuration task ownership module may execute to identify a best anchor node for the current peripheral device workspace, based on the previously determined rankings for each of the smart nodes within a given peripheral device workspace from first to last choice to execute firmware or software updates and institute peripheral device configuration policies across the peripheral devices within the peripheral device workspace. Such a determination may take into account, in some cases, the removal of one or more smart nodes, including information handling system nodes, from consideration as an anchor node due to high workload as described directly above.

Upon identification of the currently highest ranked smart node, including any information handling system nodes, within the peripheral device workspace in such a way, code instructions for the adaptive peripheral device workspace node update and configuration task ownership module may execute to identify the highest ranking smart node as the anchor node for the peripheral device workspace. All updates to peripheral device firmware or peripheral device operational configuration policies may then be pushed to the newly designated anchor node for the peripheral device workspace, which may execute code instructions of an ecosystem manageability sub-agent to transmit, or automatically install, apply, or execute these received updates for all peripheral devices within the peripheral device workspace. In such a way, the adaptive peripheral device workspace node update and configuration task ownership module in embodiments may dynamically or adaptively assign ownership of firmware or software updates or peripheral device operational configuration policy application execution across a plurality of smart peripheral device nodes including information handling system nodes, each comprising nodes of the peripheral device workspace, based on periodically gathered capabilities, workloads, and hardware capacities for each of the nodes.

FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

It is appreciated that, in some embodiments herein, the information handling system 100 may be one of a plurality of device nodes as part of a peripheral device workspace described in embodiments herein or an information handling system 100 may serve as a peripheral device workspace cloud orchestrator server 158 that is operatively coupled to a peripheral device workspace cloud orchestrator console 160 for display of a graphical user interface in the peripheral device workspace cloud orchestrator 156 described herein. In an embodiment, the cloud orchestrator console 160 may also be an information handling system 100 itself for display of a graphical user interface that is used by an internet technology decision maker (ITDM) to create peripheral device operational configuration policies with one or more peripheral device workspace cloud orchestrator servers 158 to be propagated down to node devices within a peripheral device workspace such as an information handling system node 100, a docking station 151, video display device 144, keyboard 146, stylus 148, trackpad 150, mouse 152, and the like. In this embodiment, the information handling system node 100 in the peripheral device workspace, may receive the peripheral device operational configuration policies generated by the ITDM at the peripheral device workspace cloud orchestrator console 160, or generated by execution of one or more software modules such as the peripheral device workspace cloud manageability orchestrator module 166 in the peripheral device workspace cloud orchestrator 156 based on default peripheral device configuration settings via execution of code instructions of the cloud manageability orchestrator module 166 and the ecosystem manageability service module 168 at the peripheral device workspace cloud orchestrator server 158 as described in embodiments herein.

An ITDM may also use the peripheral device workspace cloud orchestrator console 160 to indicate availability for each of the smart nodes, such as a smart peripheral device or secondary information handling system within a peripheral device workspace to execute or implement received peripheral device operational configuration policies or firmware or software updates among one or more operatively coupled peripheral devices. In some cases, the ITDM in an embodiment may make such a determination based on ability of the smart peripheral device or secondary information handling system to operatively couple with any given peripheral device 142 within the peripheral device workspace. In other embodiments, execution of code instructions for the adaptive peripheral device workspace node update and configuration task ownership module 169 determine from capabilities data for the nodes in a peripheral device workspace whether a node has processing capability, memory capability, network connectivity to the peripheral device workspace cloud orchestrator server 158, and intranode connectivity to nodes in the peripheral device workspace. For example, a smart peripheral device or secondary information handling system for the peripheral device workspace may not be capable of operative coupling with one or more of the peripheral devices 142 due to incompatible ports or communication protocols. Such compatibility information for the smart peripheral device node, a secondary information handling system node, or various peripheral device nodes may be determined from the orchestrated device designator (ODD) for each of these devices and intranode connectivity, as stored within the peripheral device workspace management system database 167. In various other embodiments, code instructions for the adaptive peripheral device workspace node update and configuration task ownership module 169 may execute to provide similar determinations and may define, within a pre-stored function interface availability for each of the information handling system nodes (e.g., including 100) and all smart nodes within a given peripheral device workspace and their availability to implement peripheral device operational configuration policies or firmware or software updates at each of a plurality of peripheral devices 142 for that peripheral device workspace. Definition of the pre-stored function interface availability may be determined by designations received from an ITDM, whether security requirements between nodes are met, or from whether node to node connectivity or format compatibility is available between nodes among other factors. Definition of the pre-stored function interface availability may be applied to firmware or software update tasks separately from application to operational policy configuration updates that may apply to nodes in the peripheral device workspace in embodiments herein.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 103, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a docking station 151, a mouse 152, a trackpad 150, a keyboard 146, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 103, or any other hardware processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, wired network interface device 129, the wireless interface adapter 128, or a radio 130, among other components described herein. In an embodiment, the information handling system 100 may be in wired or wireless communication with the I/O devices 142 such as a docking station 151, a keyboard 146, a mouse 152, video display device 144, stylus 148, or trackpad 150 among other peripheral devices any combination of which may form one or more various peripheral device workspaces according to embodiments herein.

The information handling system 100 further includes a video/graphics display device 144. The video/graphics display device 144 in an embodiment may function as a liquid crystal display (LCD), an organic light emitting diode (OLED), a flat panel display, or a solid-state display. It is appreciated that the video/graphics display device 144 may be wired or wireless and may be an external video/graphics display device 144 that allows a user to increase the desktop area by extending the desktop in an embodiment. Additionally, as described herein, the information handling system 100 may include or be operatively coupled to one or more other I/O devices 142 including the wired or wireless mouse 152 described herein that allows the user to interface with the information handling system 100 via the video/graphics display device 144, a cursor control device (e.g., a trackpad 150, or gesture or touch screen input), a stylus 148, and/or a keyboard 146, among others. Information handling system 100 may also be operatively coupled to a peripheral device 142 such as a docking station 151 or other smart peripheral device having a hardware processing device such as a hardware processor, microcontroller, or other hardware processing resource and which may further be operatively coupled to one or more additional peripheral devices 142. As described herein, each of these input/output devices 142 may each be a node device associated with the information handling system 100 and may be part of a peripheral device workspace defined and identified with a peripheral device workspace identification value via execution of the ecosystem manageability service module 168 and cloud manageability orchestrator module 166, as described in embodiments herein. Various drivers and hardware control device electronics may be operatively coupled to operate the I/O devices 142 according to the embodiments described herein. The present specification contemplates that the I/O devices 142 may be wired or wireless.

A network interface device 129 of the information handling system 100 may be wired or wireless as shown as wireless interface adapter 128 can provide connectivity among devices such as with universal serial bus (USB) or Bluetooth® or to a network 136, e.g., a wide area network (WAN), a local area network (LAN), wireless local area network (WLAN), a wireless personal area network (WPAN), a wireless wide area network (WWAN), or other network. In an embodiment, this network 136 may be operatively coupled to or include a peripheral device workspace cloud orchestrator 156 that includes one or more servers (e.g., peripheral device workspace cloud orchestrator server 158) or other computing devices that provide computer system resources as described herein that allow for the creation and maintenance of peripheral device workspaces (e.g., as shown below in FIGS. 2 and 3) and orchestration of different node devices within one or more peripheral device workspaces. In embodiments described herein, wired network interface device 129 is used to communicate an any of a plurality of wired communication standards such as various USB standards such as USB-A or USB-C, high-definition multi-media (HDMI), DisplayPort, Ethernet, and others. In embodiments described herein, the wireless interface device 128 with its radio 130, RF front end 132 and antenna 134 is used to communicate with the wireless peripheral devices via, for example, a Bluetooth® or Bluetooth® Low Energy (BLE) protocols. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a hardware device connected to a network 136 may communicate voice, video, or data over the network 136. Further, the instructions 112 may be transmitted or received over the network 136 via the network interface device 129 or wireless interface adapter 128. It is appreciated that any computing device including the cloud orchestrator server 158, the cloud orchestrator console 160, and the information handling system 100 may include a computer-readable medium that includes instructions, parameters, and profiles 112.

The information handling system 100 may include a set of instructions 112 that may be executed to cause the computer system to perform any one or more of the methods or computer-based functions disclosed herein. For example, instructions 112 may be executed by a hardware processor 102, GPU 103, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 103 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 103 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 103, a video/graphic display device 144, or other wired I/O devices 142 such as the mouse 152, the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 is operatively coupled to a peripheral device workspace cloud orchestrator 156 that includes any number of servers, computing devices, and other cloud computing resources such as the peripheral device workspace cloud orchestrator server 158. The peripheral device cloud orchestrator 156 may, therefore, include any hardware that may be distributed over multiple physical locations but act in concert with each other and specifically the peripheral device workspace cloud orchestrator server 158 to facilitate maintenance and implementation of peripheral device operational configuration policies and firmware or software updates for a plurality of peripheral device workspaces, wherein the one or more node devices (e.g., including the information handling system 100 as an anchor node device, and one or more peripheral device nodes such as I/O devices 142) form part of each peripheral device workspace, create or adjust peripheral device operational configuration policies based on the registered node devices detected within the one or more created peripheral device workspaces, and apply the peripheral device operational configuration policies and firmware or software updates to the created peripheral device workspace(s). It is appreciated that the node devices described herein may include each of the peripheral devices operatively coupled to the information handling system 100 acting as a primary or anchor node device and the workspaces created may be described as a peripheral device workspace.

The peripheral device workspace cloud orchestrator server 158 may be any computing device that may include similar elements as the information handling system 100 such as a memory device, a cloud orchestrator hardware processing device 170, a PMU, and other elements that allow the peripheral device workspace cloud orchestrator server 158 to execute code instructions of one or more software or firmware modules of the peripheral device workspace cloud orchestrator 156 including the cloud manageability orchestrator module 166, ecosystem manageability service module 168, adaptive peripheral device workspace node update and configuration task ownership module 169, and other software as described herein. In an embodiment, the peripheral device workspace cloud orchestrator server 158 may be operatively coupled to a peripheral device workspace cloud orchestrator console 160. The peripheral device workspace cloud orchestrator console 160 may be used by the ITDM in some embodiments to create and propagate peripheral device operational configuration policies, or to manage dynamic peripheral device workspace sessions (e.g., associate a user's identification with a peripheral device workspace with a user composite peripheral device workspace identifier). It is appreciated that the peripheral device workspace cloud orchestrator console 160 may include a cloud orchestrator input device 162 and a cloud orchestrator video display device 164 that allows the ITDM to complete these processes and engage with the peripheral device workspace cloud orchestrator server 158 in an embodiment.

As described herein, the peripheral device workspace cloud orchestrator server 158 includes a computer-readable program code of the peripheral device workspace cloud orchestrator 156 including a peripheral device workspace cloud manageability orchestrator module 166 that, when executed by the cloud orchestrator hardware processing device 170 of the peripheral device workspace cloud orchestrator server 158, manages creation and adjustment of peripheral device operational configuration policies for one or more node devices. In the context of embodiments of the present specification and in the appended claims, a peripheral device workspace may be an ecosystem of node devices (e.g., including peripheral devices coupled to the information handling system 100, a docking station 151, or other smart peripheral devices such as a smart external display device etc.) connected to a primary or anchor node device such as the information handling system 100. In an embodiment, a peripheral device workspace may also be defined with a peripheral device workspace identification value and be part of a user composite peripheral device workspace identifier for a user and associated with each of the information handling system 100 and peripheral devices (e.g., input/output devices 142) such that a user may have multiple peripheral device workspaces having peripheral device workspace identification values that are associated with the user based on the context and/or environment of each identified peripheral device workspace. For example, a user composite peripheral device workspace identifier may be used to define a first peripheral device workspace at a home office having a first peripheral device workspace identification value, a second peripheral device workspace at a work office having a second peripheral device workspace identification value, a third peripheral device workspace at a different location (e.g., a coffee shop) having a third peripheral device workspace identification value, and other peripheral device workspaces that can be defined by both the node devices included within the peripheral device workspace and the location of the peripheral device workspace (e.g., defined by location data such as GPS data, network data, or other data to link to a physical location) and having a having a peripheral device workspace identification value.

In an embodiment, the execution of computer-readable program code of the peripheral device workspace cloud manageability orchestrator module 166 at the peripheral device workspace cloud orchestrator server 158 will receive, create, or adjust peripheral device operational configuration policies based on the registered node devices detected within the one or more created peripheral device workspaces having peripheral device workspace identification values. In some embodiments, the peripheral device operational configuration policies may be received from the peripheral device workspace cloud orchestrator console 160 as initiated by the ITDM in one embodiment, or automatically generate from execution of code instructions of one or more other software modules of the peripheral device workspace cloud orchestrator 156. The ITDM may be any information technology decision maker that may decide the peripheral device operational configuration policies to be associated with peripheral device workspaces formed at the peripheral device workspace cloud orchestrator server 158 and having peripheral device workspace identification values. For example, the ITDM may decide which settings for each of the node devices, including the primary or anchor node device, is an optimal and desired setting to be used. In such an example embodiment, the ITDM may create these peripheral device operational configuration policies and desired settings at the peripheral device workspace cloud orchestrator console 160 for capabilities of particular peripheral devices. In other example embodiments, these settings may be set by the peripheral device workspace cloud manageability orchestrator module 166 to a default configuration or an automatic configuration determined based on identified capabilities of a given peripheral device, as described with an ODD for that given peripheral device. In various embodiments herein, the peripheral device workspace cloud orchestrator 156 executing on the peripheral device workspace cloud orchestrator server 158 may propagate these peripheral device operational configuration policies from the peripheral device workspace cloud orchestrator server 158 executing the peripheral device workspace cloud manageability orchestrator module 166. Upon receipt of these peripheral device operational configuration policies, the execution of the peripheral device workspace cloud manageability orchestrator module 166 may propagate these peripheral device operational configuration policies and firmware or software updates to each of the device nodes within the created peripheral device workspace under management by the peripheral device workspace cloud orchestrator 156.

In an embodiment, the peripheral device workspace cloud orchestrator server 158 may also execute computer readable program code of an ecosystem manageability service module 168. Execution of the ecosystem manageability service module 168 applies the peripheral device operational configuration policies to the created peripheral device workspace. In an embodiment, the peripheral device workspace cloud manageability orchestrator module 166 creates or adjusts peripheral device operational configuration policies for each of the one or more node devices within the peripheral device workspace. As described herein, the ecosystem manageability service module 168 may identify those peripheral devices 142 that form part of the peripheral device workspace having a peripheral device workspace identifier value and may propagate those peripheral device operational configuration policies that apply to those peripheral devices. For example, where a plurality of peripheral device workspaces with a plurality of peripheral device workspace identifier values each include a specific wireless mouse for which a peripheral device operational configuration policy has been created or updated, the execution of the computer-readable program code of the ecosystem manageability service module 168 causes the peripheral device workspace cloud orchestrator server 158 to send those peripheral device operational configuration policies to the appropriate peripheral device workspace (e.g., to each of the primary or anchor node devices 100 or other selected smart node device as determined in embodiments herein) so that those peripheral device operational configuration policies may be passed to the wireless mice in each peripheral device workspace having a peripheral device workspace identifier value where such as specific mouse model or type is located.

A node device database as part of the peripheral device workspace management system database 167 operatively coupled to the peripheral device workspace cloud orchestrator server 158 may provide the peripheral device workspace cloud orchestrator server 158 with details regarding the node devices detected and forming the peripheral device workspaces and associated particular peripheral device workspace identification values described herein. For example, the node device database as part of the peripheral device workspace management system database 167 may include data regarding the hardware capabilities for hardware processing resources, memory, network connectivity, or power levels of node devices in a peripheral device workspace, the possible settings for any given node device, compatibility and internode communication capability of these node devices with other node devices within any given peripheral device workspace, and other settings and capabilities of the node devices among other characteristics and features of the node devices.

An information handling system 100 that is operatively connected to one or more peripheral devices 142 in an embodiment may operate as an anchor node for the peripheral device workspace in that it gathers capabilities and peripheral device operational and environmental context telemetry readings about all of the peripheral devices 142, within a given peripheral device workspace, as described directly below, communicates that peripheral device operational and environmental context telemetry readings to the cloud manageability orchestrator module 166, receives peripheral device operational configuration policies describing how to configure the peripheral devices 142, and the anchor node information handling system 100 itself, and implements peripheral device operational configuration policies.

Execution of code instructions for an ecosystem manageability sub-agent 172 on a user information handling system 100 monitors for sets of environmental context data of a peripheral device workspace, such as time, applications currently executing or planned, hardware component usage metrics, connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible peripheral device operational and environmental context telemetry readings for the information handling system node 100 and peripheral device nodes 142 in a peripheral device workspace. These peripheral device operational and environmental context telemetry readings associated with a peripheral device workspace identification value may be gathered routinely in telemetry measurements, or upon each startup of an anchor information handling system 100, for example. The ecosystem manageability sub-agent 172 executing at the information handling system 100 in a peripheral device workspace may create a manifest of peripheral device nodes 142 and other nodes for a peripheral device workspace identification value to represent the current peripheral device workspace, including an identification of a location, identification of the user, and an identification (e.g., by product serial number or other peripheral device identification) of each of the peripheral device nodes 142 connected to or operably coupled to the anchor information handling system 100 at a peripheral device workspace. Identification of the each of the peripheral device nodes 142 may include or be associated with an ODD in various embodiments herein.

The hardware processor 102 of the user anchor information handling system 100 may execute code instructions of the ecosystem manageability sub-agent 172 to also collect one or more peripheral device operational telemetry readings (e.g., time, applications executing, hardware component usage metrics, or other telemetry data indicating usage patterns for the information handling system 100 or various peripheral devices 142 in a peripheral device workspace). The manifest of peripheral device nodes and other nodes as well as location of a peripheral device workspace described above may be combined with the peripheral device operational telemetry readings for the peripheral device workspace and an identification of the anchor node information handling system 100 user into a peripheral device workspace anchor node status update document written in a machine-readable language or machine markup language such as JavaScript Object Notation (JSON), for example, and to be associated with a peripheral device workspace identification value. The peripheral device workspace anchor node status update document may be transmitted for storage with the peripheral device workspace identification value at a peripheral device workspace management system database 167 operating in the peripheral device workspace cloud orchestrator 156. Each time a peripheral device configuration setting is changed by the user, a new peripheral device is added to the peripheral device workspace, or changes to peripheral device operational telemetry readings for the peripheral device workspace are detected, a new peripheral device workspace anchor node status update document including this updated configuration may be transmitted to the peripheral device workspace cloud orchestrator 156.

The peripheral device workspace management system database 167 may further store a user composite peripheral device workspace identifier that is unique to individual users of one or more defined peripheral device workspaces that are associated with identification of the user of the user's information handling system 100 and peripheral device workspace identification values of the peripheral device workspaces used by that user. Thus, a user composite peripheral device workspace identifier may identify a single user of an anchor node information handling system 100, and a peripheral device workspace identification value for each of one or more peripheral device workspaces in which the user's information handling system 100 operates as an anchor node at various times. The user composite peripheral device workspace identifier may thus be user-specific and user-centric. The peripheral device workspace identification value, in comparison, may define a location and list of peripheral device nodes 142, and may thus be peripheral device workspace-centric.

When referred to as a "system," a "device," a "module," a "controller," or the like, the embodiments described herein can be configured as hardware. For example, a portion of an information handling system device may be hardware such as an integrated circuit (e.g., Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
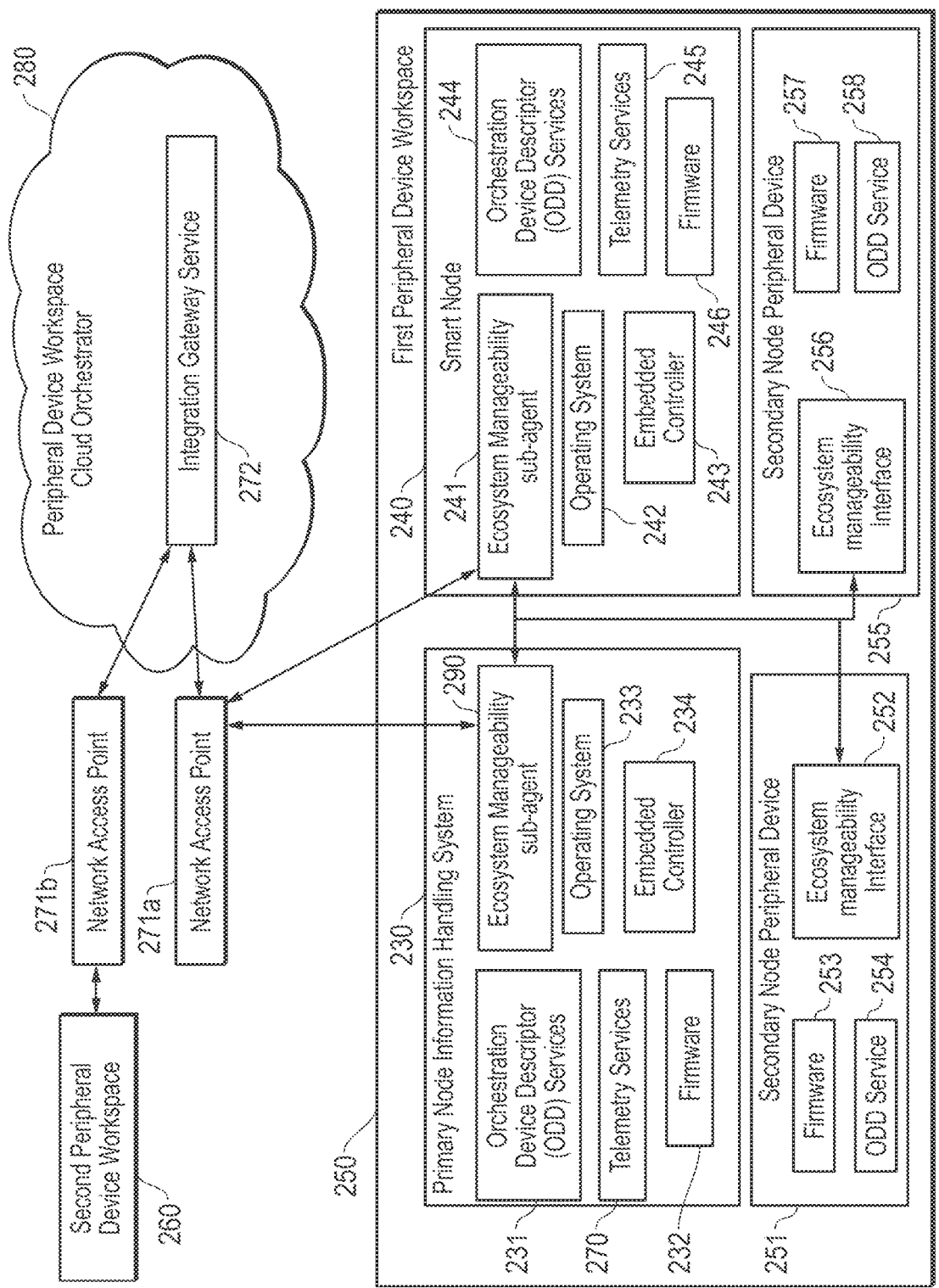
FIG. 2 is a block diagram illustrating first peripheral device workspace including a user anchor information handling system node and one or more smart peripheral device nodes and other peripheral device nodes managed with a cloud-based peripheral device workspace cloud orchestrator according to an embodiment of the present disclosure.

FIG. 2 is a block diagram illustrating a cloud-based peripheral device workspace cloud orchestrator for defining a first of a plurality of peripheral device workspaces in which a user information handling system node operatively couples with a first plurality of peripheral device nodes according to an embodiment of the present disclosure. As described previously, a user may oftentimes use an information handling system 230 in a peripheral device workspace 250. In this context, a peripheral device workspace 250 or 260 can be viewed as an environment with a location identifier that includes the user information handling system node 230 (e.g., a laptop) operating as a primary or anchor node for the peripheral device workspace 250 and peripheral device nodes 240, 251 and 255 operating as secondary nodes of the peripheral device workspace 250 that are connected to the user information handling system 230. An environmental context may include, for example, location, time of day, applications being executed, wireless or wired connection capabilities, current usage metrics or functional capabilities for one or more hardware components, or security credentials for the user. Peripheral device nodes 240, 251 and 255 may commonly include internal or external devices such as displays, a keyboard, a mouse, a webcam, a printer, a speaker, a fingerprint scanner, etc. According to various embodiments herein, a peripheral device workspace 250 or 260 may include a wired or wireless dock or other smart node 240 by which the user information handling system 230 connects to some or all the peripheral devices including smart peripheral devices such as 240 having some compute or input/output capabilities. Peripheral device node 240 in an example embodiment may considered a "smart" peripheral device because it may operate an agent 241 or firmware 246, and include a network interface device or wireless receiver that makes the smart peripheral device 240 capable of direct communication with the cloud-based peripheral device workspace cloud orchestrator 280 via the integration gateway services 272 and the network access point 271 for some subset of secondary nodes. Similarly, a primary or anchor node information handling system node 230 is also capable of direct communication with the cloud-based peripheral device workspace cloud orchestrator 280 via the integration gateway services 272 and the network access point 271 for some or all secondary nodes in the peripheral device workspace 250 or 260.

A peripheral device workspace 250 or 260 may oftentimes be used for hybrid work scenarios. For example, a business may have an office space that includes hoteling cubes that can be assigned to, reserved by, or otherwise utilized by the business's employees as peripheral device workspaces 250 or 260. In such cases, the business may allow its employees to connect their laptops (e.g., 230) to a dock (e.g., 240) in a particular hoteling cube where various peripherals (e.g., 251 and 255) may be available for use. A business may also have a collaborative peripheral device workspace 250 or 260 that may be a conference room or meeting room where plural users with plural primary node information handling systems 230 utilize some or all peripheral device nodes in that peripheral device workspace at the same time. Users may also employ peripheral device workspaces 250 or 260 when working from home or other locations.

When a user employs multiple peripheral device workspaces 250 or 260 (e.g., by connecting a laptop to different combinations of peripheral devices during a workday), it can be tedious for the user to configure the peripheral device workspaces 250 or 260 to his or her preferences. For example, while using one peripheral device workspace 250, the user may set configurations for the peripheral device nodes 240, 251 and 255 of the peripheral device workspace 250 to match the user's preferences or they may be configured to meet an operating policy set by an ITDM for a given peripheral device workspace. If the user switches to a different peripheral device workspace 260, those configurations may not be consistent with the peripheral devices (not shown) of the different peripheral device workspace 260 or may result in unintended changes. The user may therefore have to manually reconfigure the peripheral devices (not shown) within the peripheral device workspace 260.

As one particular example, a user may have a home peripheral device workspace 250 that includes a 4K monitor peripheral device 251 with 3840×2160 resolution at 60 Hz that is in landscape orientation and that also includes a 32-inch Full High Definition (FHD) monitor with 1920× 1080 resolution that is in portrait orientation. This user may have set adjustable operational configurations for this home peripheral device workspace 250 to personalize these display devices. The user may also have access to multiple office peripheral device workspaces such as 260 (e.g., in a hoteling scenario), and these peripheral device workspaces such as 260 may have different sets of peripheral devices such as a first office peripheral device workspace with two display devices and a second office peripheral device workspace with a single display device or a conference room. If the user's adjustable operational configurations for the home peripheral device workspace 250 are applied to the office peripheral device workspaces such as 260, the display device(s) will likely not be configured in accordance with the user's preferences. The user will then need to manually reconfigure the office peripheral device workspace 260 to achieve her preferences. When the user returns to her home peripheral device workspace 250, she may again be required to manually reconfigure the home peripheral device workspace 250. As can be seen, when using multiple peripheral device workspaces 250 and 260, personalized adjustable operational configurations for peripheral devices such as 251 are likely to be lost or misapplied due to the mismatching set of peripheral devices that make up the peripheral device workspaces 250 and 260. These issues arise in cases where the user switches between entirely different peripheral device workspaces 250 and 260 (e.g., when leaving home where a home peripheral device workspace is used to travel to work where an office peripheral device workspace is used) as well as in cases where the user creates a different peripheral device workspace 250 or 260 through the connection and/or disconnection of a peripheral device node such as 240, 251 or 255 (e.g., when connecting an external webcam to a dock or laptop that is part of an existing peripheral device workspace).

Execution of code instructions for an ecosystem manageability sub-agent 290 on a user information handling system node 230 monitors telemetry readings taken by a telemetry service 270 for environmental context data of a peripheral device workspace 250, such as time, location, applications currently executing or planned, current usage metrics defining current functional capabilities for various hardware components (e.g., hardware processors, memory, power), connection type (e.g., wireless, wired, wireless wide area network (WWAN), wireless local area network (WLAN), wireless private area network (WPAN)), security credentials for the user, or environmental sensor readings (e.g., humidity, temperature, ambient light), among other possible telemetry readings for the information handling system 230. These telemetry measurements may be gathered routinely, or upon each startup of an information handling system 230, for example.

In addition, the peripheral device workspace cloud orchestrator 280 may gather information regarding the range of capabilities for each peripheral device node (e.g., 240, 251 and 255) and may include indication of any hardware processing resource capabilities, memory resource capabilities, network connectivity access resources, and intranode connectivity resources among others. Each peripheral device, such as 251 may include a range of capabilities, and the user may choose to configure the peripheral device 251 to operate according to a selected setting or configuration within this range of capabilities. For example, in an embodiment in which the peripheral device 251 is an external display device, the peripheral device 251 may be capable of operating within a range of functional capabilities defining the display resolution, such as between a resolution of 640×480 pixels, which may be the lowest resolution supported by the operating system 233, and a best or maximum functional capability of 3840×2160 pixels, which is the standard resolution for 4K Ultra-High Definition (4K UHD) monitors. Thus, the functional capabilities for the peripheral device 251 in such an example may be the entire range between 640×480 pixels and 3840×2160 pixels. The user may select an adjustable operational configuration for the peripheral device 251 by choosing one available resolution within this range of 620×480 pixels and 3840×2160 pixels. This may be done by the user, for example, through a "preferences," "properties," or "settings" user interface within the operating system 233. Because the user may choose one of several available configurations within the range of functional capabilities, the chosen configuration may be referred to herein as an adjustable operational configuration that may be selected by the user. In some cases, the peripheral device 251 may be preset with a default configuration. These default configurations may also be considered adjustable operational configurations herein, in that the user has the opportunity to adjust such a default configuration through the "preferences," "properties," or "settings" user interface within the operating system 233. In such a way, the peripheral device 251 may be configured according to a user-selectable, adjustable operational configuration that lies within a range of functional capabilities for the peripheral device. Other capabilities may include hardware processing, memory, and network or intranode connectivity capabilities for a peripheral device 251, such as types of wired connectors or wireless protocols available configuration may include selection of connectivity type as well as speeds or bandwidths available. The operating system 242 of the smart node 240 in an embodiment may have similar capability of receiving user input selecting an adjustable operational configuration when the smart node 240 acts as an anchor node within the workspace 250.

The information defining the range of functional capabilities for the peripheral devices 240, 251, or 255 and for the information handling system 230 may be stored at the peripheral devices or information handling system within the firmware 246, 253, 257, or 232 respectively. In another embodiment, the range of functional capabilities for the peripheral devices 240, 251, or 255 and for the information handling system 230 may include a maximum or best hardware resource availability metric for various hardware components for the information handling system 230 and may be stored at an orchestration device descriptor (ODD) service 244, 254, 258, or 231 respectively. In an embodiment, the ODD services 244, 254, 258, or 231 for the peripheral devices 240, 251, and 255, and information handling system 230, respectively, may also store static or non-adjustable features for the peripheral devices 240, 251, and 255, and information handling system 230, such as locations for various ports, physical dimensions of the peripheral devices 240, 251, and 255, and information handling system 230, and physical locations for internal components such as an embedded camera. Each ODD for a given peripheral device 240, 251, or 255 or for an information handling system such as 230 may further describe maximum or best hardware resource availability metrics for one or more hardware components, such as number and type of hardware processors, total memory, total storage, total number of hardware processing cores, and total number of hardware processing threads. Model number, device number, serial number media access control (MAC) address, or other identifying information for the peripheral devices 240, 251, and 255, and information handling system 230, may also be stored within the ODD services 244, 254, 258, or 231, respectively, within an ODD. Configurable capabilities of peripheral devices 240, 251, and 255, and a unique peripheral device identifier such as a serial number, and a peripheral device type classification (e.g., mouse, display, keyboard, webcam, etc.) may be included in the ODD.

The ecosystem manageability sub-agent 290 of the anchor node information handling system 230 in an embodiment may retrieve the functional capabilities or best hardware resource availability metrics for the peripheral devices 251, and 255 from the firmware 253, or 257, respectively, or from ODD services 254, and 258, respectively, via communication with the ecosystem manageability interfaces 252 and 256, which may act as application programming interfaces (APIs), for example, between the firmware 253, or 257, respectively, or the ODD services 254, and 258, respectively, and the ecosystem manageability sub-agent 290. With respect to smart node 240, the ecosystem manageability sub-agent 290 in an embodiment may retrieve the functional capabilities for the smart node 240 from the firmware 246, or from ODD services 244, via communication with the ecosystem manageability sub-agent 241 which may also act as an API, for example, between the firmware 246, or the ODD services 244, and the ecosystem manageability sub-agent 290. The ecosystem manageability sub-agent 241 of the smart node 240 may also be capable, in an embodiment in which the smart node 240 acts as an anchor node, of retrieving the functional capabilities for the peripheral devices 251, and 255 from the firmware 253, or 257, respectively, or from ODD services 254, and 258, respectively, and for the information handling system 230 from firmware 232 and 231.

The ecosystem manageability sub-agent 290 in an embodiment may gather this information from the various ecosystem manageability interfaces 252 and 256, and ecosystem manageability sub-agents 290 and 241, for example, upon each detection of operative coupling of the peripheral devices 251 and 255, or smart node 240, respectively, with the anchor node information handling system 230, or upon an initial pairing. In an embodiment, the ecosystem manageability sub-agent 290 in an embodiment may transmit the gathered functional capabilities for the peripheral devices 251, 255, or smart node 240 to the peripheral device workspace cloud orchestrator 280, via the network access point 271a and the integration gateway service 272. When smart node 240 is an anchor node, the ecosystem manageability sub-agent 241 in an embodiment may gather this information from the various ecosystem manageability interfaces 252 and 256, and ecosystem manageability sub-agents 290 and 241, for example, upon each detection of operative coupling of the peripheral devices 251 and 255, or information handling system node 230, respectively, with the smart node 240, or upon an initial pairing. In an embodiment, the ecosystem manageability sub-agent 241 in an embodiment may transmit the gathered functional capabilities for the peripheral devices 251, 255, or information handling system node 230 to the peripheral device workspace cloud orchestrator 280, via the network access point 271a and the integration gateway service 272 in a second wireless link when smart node 240 takes ownership of the peripheral device workspace 250 according to embodiments herein.

The anchor node information handling system 230 in an embodiment may also include a hardware processor or embedded controller 234 executing code instructions of the ecosystem manageability sub-agent 290. The anchor node 230 in an example embodiment may be operatively coupled to secondary node peripheral devices 251, and 255 which may further include microcontrollers executing code instructions of ecosystem manageability interfaces 252 and 256 and firmware 253, and 257. The ecosystem manageability interfaces 252 and 256 in an embodiment may facilitate communication between the ecosystem manageability sub-agent 290 and the firmware 253 or 257 for the secondary node peripheral devices 251 and 255, respectively. The anchor node 230 in an example embodiment may also be operatively coupled to a smart node 240 which may further include a microcontroller 243 executing code instructions of an ecosystem manageability sub-agent 241 and firmware 246 and telemetry services 245. Current hardware resource availability metrics for various hardware components of the information handling system 230 may be gathered by the telemetry services 245 in an example embodiment. The ecosystem manageability sub-agent 241 in an embodiment may facilitate communication between the ecosystem manageability sub-agent 290 and the firmware 246 or the ODD services 244 for the smart node 240.

The smart node 240 in an embodiment may include a hardware processor or embedded controller 243 executing code instructions of the ecosystem manageability sub-agent 241. The smart node 240 in an example embodiment in which it is acting as an anchor node for the peripheral device workspace 250 may be operatively coupled to secondary node peripheral devices 251, and 255 which may further include microcontrollers executing code instructions of ecosystem manageability interfaces 252 and 256 and firmware 253, and 257. The ecosystem manageability interfaces 252 and 256 in an embodiment may facilitate communication between the ecosystem manageability sub-agent 241 and the firmware 253 or 257 for the secondary node peripheral devices 251 and 255, respectively.

The ecosystem manageability sub-agent 290 in an embodiment may gather, via ecosystem manageability interfaces 252 and 256, respectively, various peripheral device operational telemetry data readings describing adjustable configurations for the secondary node peripheral devices 251 and 255, respectively within the peripheral device workspace 250. For example, in an embodiment in which the peripheral device 251 is an external display device, the ecosystem manageability sub-agent 290 may gather telemetry information including a current adjustable operational configuration at the peripheral device 251 for display resolution, display refresh rate, brightness, contrast, color gamut, horizontal view angle, vertical view angle, and response time. As another example, in an embodiment in which the peripheral device 251 is an external webcam, the ecosystem manageability sub-agent 290 may gather telemetry information including a current adjustable operational configuration at the peripheral device 251 for audio/visual connection type (e.g., HDMI, digital audio, etc.), video capture resolution, image depth, video capture refresh rate, or captured frames per second. In still another example, in an embodiment in which the peripheral device 251 is an external microphone, the ecosystem manageability sub-agent 290 may gather telemetry information including a current adjustable operational configuration at the peripheral device 251 for audio output type, audio output frequency, or audio filters (e.g., noise reduction). In yet another example embodiment, in which the peripheral device 251 is an external speaker, the ecosystem manageability sub-agent 290 may gather telemetry information including a current adjustable operational configuration at the peripheral device 251 for audio input type, and audio input frequency. In yet another example embodiment, in which the peripheral device 251 is mouse, touchpad, touchscreen, or keyboard, the ecosystem manageability sub-agent 290 may gather telemetry information including a current adjustable operational configuration at the peripheral device 251 for polling rate, keystroke or button detection, sensitivity levels, power source levels and other settings. Other types of peripheral devices 251 are also contemplated and may include relevant current adjustable operational configuration telemetry data as environmental context data for any peripheral device types as described herein.

A similar method of gathering operational or environmental telemetry data for a smart peripheral device 240 may also be performed via the ecosystem manageability sub-agent 290 in an embodiment. For example, the ecosystem manageability sub-agent 290 in an embodiment may gather, via ecosystem manageability sub-agent 241, various peripheral device operational telemetry data readings describing adjustable configurations for the smart node 240 within the peripheral device workspace 250. In addition, the ecosystem manageability sub-agent 241 for the smart node 240 in an embodiment in which the smart node 240 acts an anchor node for the peripheral device workspace 250 may gather, via ecosystem manageability interfaces 252 and 256, respectively, various peripheral device operational telemetry data readings describing adjustable configurations for the secondary node peripheral devices 251 and 255, respectively, within the peripheral device workspace 250.

The ecosystem manageability sub-agent 290 executing at the information handling system 230 may create a manifest listing each of the peripheral device nodes 240, 251 and 255 within the peripheral device workspace 250, as well as the anchor node 230. The manifest of peripheral device nodes 240, 251, and 254 and other nodes 230 as well as location of a peripheral device workspace 250 may be combined with the peripheral device operational telemetry readings for the peripheral device workspace 250 for capabilities and configuration settings and an identification of the anchor node information handling system 230 user into a peripheral device workspace anchor node status update document written in a machine-readable language or machine markup language such as JavaScript Object Notation (JSON), for example, for the peripheral device workspace. The peripheral device workspace anchor node status update document is transmitted for storage with the peripheral device workspace identification value at a peripheral device workspace management system database operating in the peripheral device workspace cloud orchestrator 280 executing on a peripheral device workspace cloud orchestrator server. Each time a peripheral device configuration setting is changed by the user, a new peripheral device is added to the peripheral device workspace 250, or changes to peripheral device operational telemetry readings for the peripheral device workspace 250 are detected, a new peripheral device workspace 250 anchor node status update document including this updated configuration may be transmitted to the peripheral device workspace cloud orchestrator 280 executing at the peripheral device workspace cloud orchestrator server.

The anchor node information handling system 230 in an embodiment may be operatively connected to the internet via a network access point (AP) 271*a*, which may further connect to one or more cloud-based applications, servers, or systems. Such cloud-based applications in an embodiment may include a peripheral device workspace cloud orchestrator 280 which communicates with the remote anchor node information handling system 230 in various peripheral device workspaces 250 and 260, respectively, via an integration gateway service 272. The integration gateway service 272 in an embodiment may operate as an Application Programming Interface (API) or a Query Language (QL) supervisor to control communications to and from the peripheral device workspace cloud orchestrator 280 executing on a peripheral device workspace cloud orchestrator server, for example. More specifically, the integration gateway service 272 may, via an API, control the query language in which queries are made to the peripheral device workspace cloud orchestrator 280. As another example, the integration gateway service 272 may use a query language supervisor, such as GraphQL® to control such queries and the format in which results are provided by the peripheral device workspace cloud orchestrator 280 executing on a peripheral device workspace cloud orchestrator server. The anchor node 230 may communicate gathered peripheral device telemetry, as well as telemetry specific to the anchor node 230 itself, to the peripheral device workspace cloud orchestrator 280 via this integration gateway service 271*a*. A similar wired or wireless network connectivity to the peripheral device workspace cloud orchestrator 280 executing on a peripheral device workspace cloud orchestrator server may be established by any smart node 240 with such capabilities via network access point 271*a* and the integration gateway service 272 in an embodiment that may operate as an Application Programming Interface (API) or a Query Language (QL) supervisor to control communications to and from the peripheral device workspace cloud orchestrator 280 executing on a peripheral device workspace cloud orchestrator server, for example.

Various peripheral device workspaces (e.g., 250 and 260) such as the hybrid work office peripheral device workspaces, collaborative peripheral device workspaces, and other peripheral device workspaces described herein may be defined by location indicator detected for an anchor node information handling system 230 operating at the peripheral device workspace 250, and a manifest of nodes of peripheral devices 251, and 255 and smart devices 240 that may operate in the peripheral device workspace 250. Each such defined peripheral device workspace 250 or 260 may also be assigned a peripheral device workspace identification value which may be stored and associated with stored manifests of nodes 230, 240, 251, and 255 operating in the peripheral device workspace 250. Additional environmental context data for the peripheral device workspace 250 may be stored within one or more peripheral device workspace anchor node status update documents as well as included in the definition of the peripheral device workspace and associated with its peripheral device workspace identification value defined at the peripheral device workspace cloud orchestrator 280 server database, including peripheral device capabilities, peripheral device connectivity details, current peripheral device configurations or settings, peripheral device setting or configuration options, current status of the peripheral devices 230, 240, 251, and 255, within the peripheral device workspace 250, and other features of nodes 230, 240, 251, and 255 within the peripheral device workspace 250. For example, the definition of the peripheral device workspace 250 associated with a specific peripheral device workspace identification value may include a set of environmental context data and stored within one or more peripheral device workspace anchor node status update documents, such as time, applications currently executing or planned, connection type, hardware component capabilities or usage metrics, or environmental sensor readings (e.g., humidity, temperature), among other possible peripheral device operational telemetry readings for an anchor node information handling system 230 operating within the defined peripheral device workspace 250.

A peripheral device workspace 250 may be defined by a location, a list of peripheral devices 240, 251 and 255 operatively coupled to an anchor node information handling system 230 for a user, type of peripheral device workspace (e.g., personal, hoteling office/shared, or collaborative), and additionally in some cases, by one or more of the peripheral device operational telemetry readings for the peripheral device workspace 250 described herein. Each of these defining factors may be associated in a database memory for the peripheral device workspace cloud orchestrator 280 with the peripheral device workspace identification value, which may also be associated with one or more peripheral device operational configuration policies describing how the nodes 230, 240, 251 and 255 within the defined peripheral device workspace 250 are to operate. Thus, a particular peripheral device operational configuration policy for one or more peripheral device nodes 240, 251 or 255 within a given peripheral device workspace 250 having a peripheral device workspace identification value may apply only when certain peripheral device operational telemetry readings, such as telemetries describing usage patterns for those peripheral device nodes 240, 251 or 255 are detected. In such a way, the peripheral device operational configuration policy for a peripheral device such as 240, 251 or 255 within a peripheral device workspace 250 may be defined or associated with particularly defined usage patterns for that peripheral device. For example, a peripheral device operational configuration policy may apply only when certain software applications are executing at the anchor node information handling system 230 defined within the peripheral device workspace 250, or when one or more hardware components' (e.g., graphics processing unit (GPU), central processing unit (CPU), memory) usage metrics or connectivity metrics meet a predefined threshold.

A database memory for the peripheral device workspace cloud orchestrator 280 executing at the peripheral device workspace cloud orchestrator server may further store a user composite peripheral device workspace identifier that is unique to individual users of one or more defined peripheral device workspaces 250 or 260 that are associated with identification of the user of the user's information handling system 230 and peripheral device workspace identification values of the peripheral device workspaces 250 or 260 used by that user. Thus, a user composite peripheral device workspace identifier may identify a single user of an anchor node information handling system 230, and a peripheral device workspace identification value for each of one or more peripheral device workspaces 250 or 260 in which the user's information handling system 230 operates as an anchor node at various times. The user composite peripheral device workspace identifier may thus be user-specific and user-centric. The peripheral device workspace identification value, in comparison, may define a location and list of peripheral device nodes, and may thus be peripheral device workspace-centric.

Figure 3:
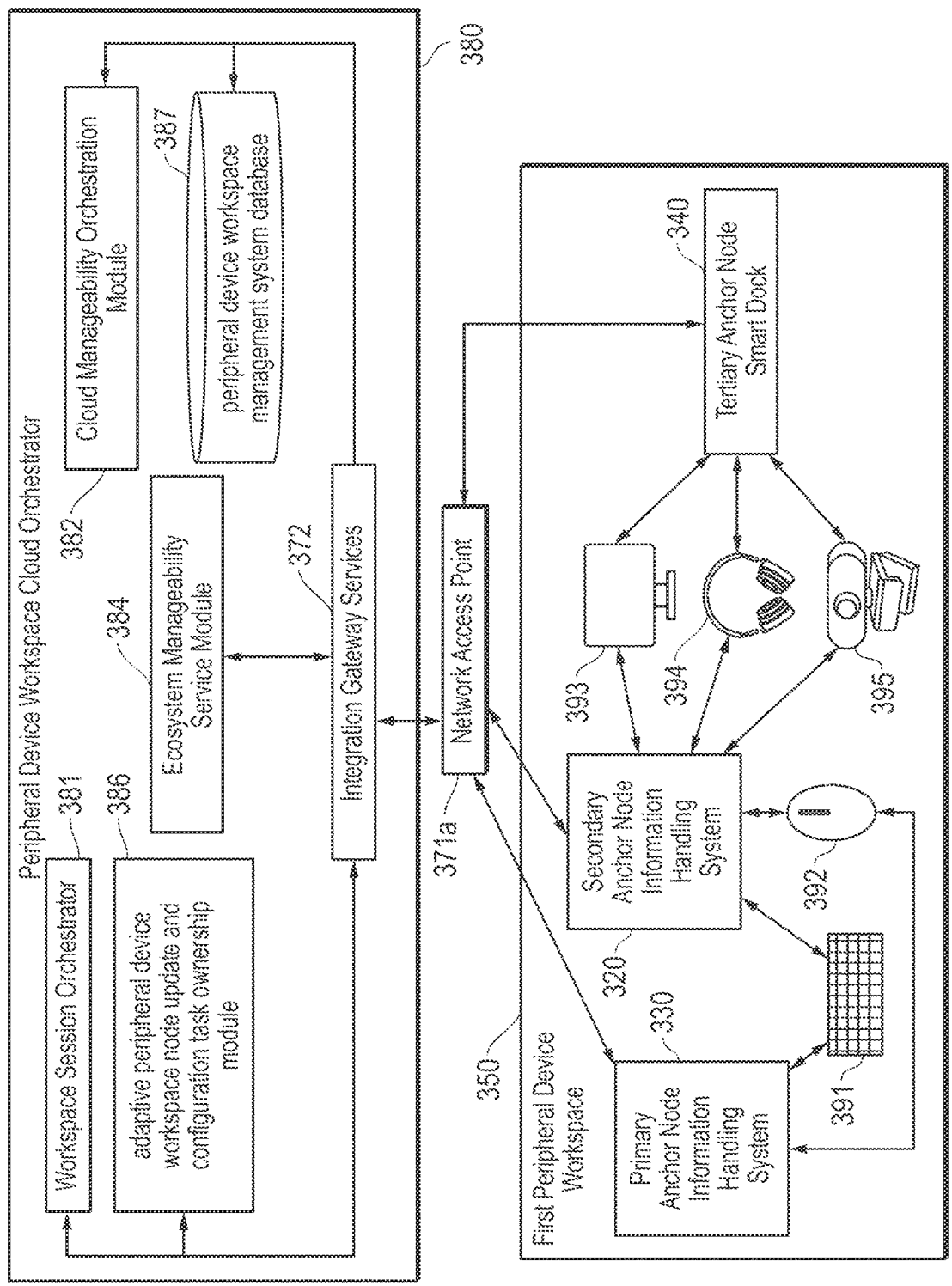
FIG. 3 is a block diagram illustrating a cloud-based peripheral device workspace cloud orchestrator server executing code instructions of one or more software modules of a peripheral device workspace cloud orchestrator for distributing ownership of firmware or software updates and peripheral device operational configuration policy application execution across a plurality of smart peripheral device nodes and anchor information handling system nodes in a peripheral device workspace according to an embodiment of the present disclosure.

FIG. 3 is a block diagram illustrating a cloud-based peripheral device workspace cloud orchestrator executing at the peripheral device workspace cloud orchestrator server for distributing ownership of firmware or software updates and peripheral device operational configuration policy application execution across a plurality of smart peripheral device nodes and information handling system nodes of a given peripheral device workspace according to an embodiment of the present disclosure. As described previously, because usage patterns for various peripheral device nodes, such as 391, 392, 393, 394, and 395 in a peripheral device workspace such as 350 may change frequently, prompting reconfiguration of those various peripheral device nodes 391, 392, 393, 394, and 395, peripheral device operational configuration policies may also need to be updated frequently. In addition, firmware or software at one or more of the peripheral device nodes such as 340, 391, 392, 393, 394, and 395 or information handling system nodes 330 within a given peripheral device workspace such as 350 may need to be routinely updated. Peripheral device workspaces such as 350 that include a plurality of information handling system nodes such as 330 or one or more smart peripheral device nodes 320 or 340 having some compute and network capabilities that may be capable of receiving delegation of some of these frequent operational configuration policies or firmware or software update tasks away from information handling systems, such as 330 undergoing high workloads and toward under-utilized information handling systems or smart peripheral devices, such as 320 or 340 defined within the peripheral device workspace 350 as capable of such task execution.

As also described with respect to FIG. 2, above, a first peripheral device workspace anchor node 330 in an embodiment may collect peripheral device operational telemetry readings for the anchor node 330 and secondary node peripheral device nodes 320, 340, 391, 392, 393, 394, and 395, for a peripheral device workspace 350. This may include a list of existing functional capabilities for each node 320, 330, 340, 391, 392, 393, 394, and 395 in the peripheral device workspace 350, and current adjustable operational configurations of each of the existing functional capabilities for each of the nodes 320, 330, 340, 391, 392, 393, 394, and 395 in the peripheral device workspace 350. Code instructions for the ecosystem manageability sub-agent for the first peripheral device workspace anchor node 330 in an embodiment may execute to gather, via ecosystem manageability interfaces or via an ecosystem manageability sub-agent at one or more secondary node peripheral device nodes 320, 340, 391, 392, 393, 394, and 395, respectively, various peripheral device operational telemetry readings describing operational capabilities for the one or more secondary node peripheral device nodes 320, 340, 391, 392, 393, 394, and 395, respectively, within the peripheral device workspace 350, as well as adjustable operational configurations for those operational capabilities.

The first peripheral device workspace anchor node 330 in an embodiment may generate and transmit to the cloud manageability orchestrator module 382 a peripheral device workspace anchor node status update document including a manifest of peripheral device nodes 320, 330, 340, 391, 392, 393, 394, and 395 in the peripheral device workspace 350 and collected peripheral device operational telemetry readings for a peripheral device workspace location identified by a location identifier. The manifest of peripheral device node nodes 320, 330, 340, 391, 392, 393, 394, and 395 as well as location of a peripheral device workspace 350 described above may be combined with the peripheral device operational telemetry readings for the peripheral device workspace and an identification of the first anchor node information handling system node 330 user into a peripheral device workspace anchor node status update document written in a machine-readable language or machine markup language such as JavaScript Object Notation (JSON), for example, to be associated with a peripheral device workspace identification value, within the peripheral device workspace management system database 387 operating at peripheral device workspace cloud orchestrator 380 executing the peripheral device workspace cloud orchestrator server or servers. Each time a peripheral device configuration setting is changed by the user, a new peripheral device node is added to the peripheral device workspace 350, or changes to peripheral device operational telemetry readings for the peripheral device workspace 350 are detected, a new peripheral device workspace anchor node status update document including this updated configuration may be transmitted to the peripheral device workspace cloud orchestrator 380 for association with the peripheral device workspace identification value for the peripheral device workspace 350. Additionally, values for the ODD of each peripheral device node 320, 330, 340, 391, 392, 393, 394, and 395 in the manifest of peripheral devices in the peripheral device workspace 350 may also be updated with these changes.

In an embodiment, such peripheral device operational telemetry readings may include best or maximum hardware resource availability metrics for each node 320, 330, 340, 391, 392, 393, 394, or 395 within the peripheral device workspace 350. For example, peripheral device operational telemetry readings for the peripheral device workspace 350, as stored at the peripheral device workspace management system database 387 may include Orchestrated Device Descriptors (ODDs) defining best or maximum hardware resource availability metrics for the nodes 320, 330, 340, 391, 392, 393, 394, and 395. More specifically, such ODDs may indicate that the first anchor node information handling system 330 has a maximum of two available central processing units (CPUs), a maximum of 16 available CPU cores, a maximum of 32 available threads, a maximum available memory of 8 GB, and a maximum available storage of 512 GB. In another example, such ODDs may indicate that a secondary node information handling system 320 has a maximum of one available CPU, a maximum of 8 available CPU cores, a maximum of 16 available threads, a maximum available memory of 8 GB, and a maximum available storage of 256 GB. In yet another example, such ODDs may indicate that a secondary node smart dock 340 has a maximum of one available CPU, a maximum available memory of 2 MB, and a maximum available storage of 256 MB. Similar hardware resource availability metrics may be determined for other hardware resources such as memory, network connectivity levels, intranode connectivity and other resources of the nodes 320, 330, 340, 391, 392, 393, 394, and 395.

Peripheral device operational telemetry readings in an embodiment may also include current hardware resource availability metrics or resource usage levels for each node 320, 330, 340, 391, 392, 393, 394, or 395 within the peripheral device workspace 350. For example, peripheral device operational telemetry readings for the first anchor node information handling system 330, as stored at the peripheral device workspace management system database 387 may indicate that the first anchor node information handling system 330 currently has only one available CPU, only four CPU cores are currently available, only 16 threads are currently available, only 3 GB of memory are currently available, only 125 GB of storage are currently available, and only 20% of battery power is remaining. As another example, peripheral device operational telemetry readings for the peripheral device information handling system 320 may indicate that the information handling system 320 currently has one available CPU, eight CPU cores are currently available, 16 threads are currently available, 8 GB of memory are currently available, 256 GB of storage are currently available, and 80% of battery power is remaining. In yet another example, peripheral device operational telemetry readings for the smart dock 340 may indicate that the smart dock 340 currently has one available CPU, available memory of 2 MB, and available storage of 256 MB. Similar current hardware resource availability metrics may be determined for other hardware resources such as memory, network connectivity levels, intranode connectivity and other resources of the nodes 320, 330, 340, 391, 392, 393, 394, and 395.

Executed code instructions for the adaptive peripheral device workspace node update and configuration task ownership module 386 may also indicate availability for each of the smart nodes 320, 330, and 340, within a peripheral device workspace 350 to execute or implement received peripheral device operational configuration policies among one or more operatively coupled peripheral devices 391, 392, 393, 394, and 395. In some cases, such a determination may be made based on ability of the smart peripheral device 320, 330, or 340 to operatively couple with any given peripheral device 391, 392, 393, 394, or 395 within the peripheral device workspace 350. For example, the smart peripheral device 340 for the peripheral device workspace 350 may not be capable of operative coupling with one or more of the peripheral devices 391 or 392 due to incompatible ports or communication protocols. Such compatibility information for the smart peripheral devices 320, 330, and 340, and various peripheral devices 391, 392, 393, 394, and 395 may be taken from the orchestrated device designator (ODD) for each of these devices, as stored within the peripheral device workspace management system database 387. Such determinations may be adjusted by input from an ITDM that may be received at the adaptive peripheral device workspace node update and configuration task ownership module 386 in some embodiments.

In effect, the code instructions executed for the adaptive peripheral device workspace node update and configuration task ownership module 386 may define, within a pre-stored function interface availability for each of the smart nodes 320, 330, and 340 within a given peripheral device workspace 350, availability to implement peripheral device operational configuration policies at each of a plurality of peripheral devices 391, 392, 393, 394, or 395 for that peripheral device workspace. More specifically, the pre-stored function interface availability for the first information handling system 330 may indicate that is available to configure each of the peripheral devices 391, 392, 393, 394, and 395. In another example, the pre-stored function interface availability for the second information handling system 320 may indicate that is not available to configure any of the peripheral devices 391, 392, 393, 394, or 395. In yet another example, the pre-stored function interface availability for the smart dock 340 may indicate that is available to configure each of the peripheral devices 393, 394, and 395.

Code instructions for the adaptive peripheral device workspace node update and configuration task ownership module may also execute in an embodiment to determine, for each smart node within each peripheral device workspace, a ranking score based on comparison of maximum hardware resource availability, current hardware resource availability, and current function interface availability among smart nodes. For example, code instructions for the adaptive peripheral device workspace node update and configuration task ownership module may execute to generate an update execution ownership role table, such as example Table 1, below.

TABLE 1

| Potential Anchor Nodes | Best Hardware Resource Availability | Current Hardware Resource Availability | Function Interface Availability | Total Scoring | Update Execution Ownership Role |
|---|---|---|---|---|---|
| Information Handling | CPUs - 1 Cores - 8 | CPUs - 1 Cores - 8 | Configuration Ownership - | 2 + 1 + 2 = 5 | Secondary Ownership - |

TABLE 1-continued

| Potential Anchor Nodes | Best Hardware Resource Availability | Current Hardware Resource Availability | Function Interface Availability | Total Scoring | Update Execution Ownership Role |
|---|---|---|---|---|---|
| system 320 | Threads - 16 Memory - 8 GB Storage - 256 GB | Threads - 16 Memory - 8 GB Storage - 256 GB Battery - 80% remaining | NO Firmware Update Ownership - YES for devices 391, 392, 393, 394, and 395 | | Firmware or software updates for devices 391, 392, 393, 394, and 395 |
| Information Handling system 330 | CPUs - 2 Cores - 16 Threads - 32 Memory - 8 GB Storage - 512 GB | CPUs - 1 Cores - 4 Threads - 8 Memory - 3 GB Storage - 125 GB Battery - 20% remaining | Configuration Ownership - YES for devices 320, 340, 391, 392, 393, 394, and 395 Firmware Update Ownership - YES for devices 320, 340, 391, 392, 393, 394, and 395 | 1 + 2 + 1 = 4 | Primary Ownership - Configuration of all devices in Peripheral Device Workspace Primary Ownership - Firmware or software updates for All Devices in Peripheral Device Workspace |
| Smart Dock 340 | CPUs - 1 Memory - 2 MB Storage - 256 MB | CPUs - 1 Memory - 2 MB Storage - 256 MB | Configuration Ownership - YES for devices 393, 394, and 395 Firmware Update Ownership - NO | 3 + 3 + 3 = 9 | Tertiary Ownership - Configuration of Peripheral Devices 393, 394, and 395 |

It is appreciated that although the example above is shown in a table format, execution of code instructions of the peripheral device workspace orchestrator and the adaptive peripheral device workspace node update and configuration task ownership module may operate in any addressable format to determine rankings for update control ownership according to various embodiments herein. As shown in the example embodiment of Table 1 above, code instructions for the adaptive peripheral device workspace node update and configuration task ownership module may execute to list, such as in the second, third, and fourth columns from the left in Table 1, for each smart node 320, 330, and 340 within the peripheral device workspace 350, the best or maximum hardware resource availability, current hardware resource availability, and pre-defined function interface availability, as determined and described directly above Table 1. The maximum and current hardware resource availability in an embodiment may include metrics for various hardware components of each smart node 320, 330, and 340, including hardware processors (CPUs, GPUs, VPUs, etc.), memory, storage, or batteries, for example. Code instructions for the adaptive peripheral device workspace node update and configuration task ownership module 386 in an embodiment may execute to determine a peripheral device update task delegation ranking score, given in the fifth column from the left in Table 1, for each smart node 320, 330, and 340. Table 1 represents one example scoring system that may be used, but any scoring system may be used to determine availability of smart nodes 320, 330, or 340 (e.g., including the information handling system node 330) to receive delegation of configuration policy adjustments or software or firmware or software updates by the adaptive peripheral device workspace node update and configuration task ownership module 386 These peripheral device update task delegation ranking scores for each smart node 320, 330, or 340 may be used to adaptively shift update tasks for firmware or software and peripheral device configurations to the most capable and least utilized smart node 320, 330, or 340 within the peripheral device workspace 350 as peripheral device operational telemetry readings change.

Such a peripheral device update task delegation ranking score for each smart node 320, 330, or 340 in a peripheral device workspace 350 in an embodiment may include a ranking of each device 320, 330 or 340 by maximum or best hardware resource availability, as taken from the orchestrated device descriptors, a rating of currently available capacity for hardware components such as processors, memory, storage, and network interface devices, and a rating of ITDM-assigned ownership capabilities. These rankings may be made in comparison to other smart nodes 320, 330, or 340 within the peripheral device workspace 350. In other words, each smart node 320, 330, or 340 may receive a ranking from one to three for the peripheral device workspace 350. In other embodiments, in which the peripheral device workspace at issue includes n number of smart nodes, each of those smart nodes may receive a ranking from one to n for each of the maximum or best hardware resource availability, current hardware resource availability, and function interface availability.

For example, the first information handling system 330 may be given a rank of one out of three for maximum or best hardware resource availability in comparison to the second information handling system 320 and the smart dock 340 due to a higher maximum number of CPUs, cores, threads, memory, and storage available at the first information handling system 330 than at either of the second information handling system 320 or smart dock 340. In another example, the first information handling system 330 may be given a rank of two out of three for current hardware resource availability in comparison to the second information handling system 320 and the smart dock 340 since the first information handling system 330 currently has available fewer cores, fewer threads, less memory, less storage, and less battery power than the second information handling system 320 due to ongoing execution of software applications or other tasks, but more memory and more storage than the smart dock 340. In yet another example, the first information handling system 330 may be given a rank of one out of three for the function interface availability because it has been designated as available for both implementation of firmware or software updates and implementation of peripheral device operational configuration policies for each of the peripheral devices 391, 392, 393, 394, and 395 in the peripheral device workspace. Code instructions for the adaptive peripheral device workspace node update and configuration task ownership module 386 in an embodiment may operate to add each of these ranks together to provide a total ranking of four out of a best value of three and a worst possible value of nine for the first information handling system 330.

In another example embodiment, the second information handling system 320 may be given a rank of two out of three for maximum or best hardware resource availability in comparison to the first information handling system 330 and the smart dock 340 due to a lower maximum number of CPUs, cores, threads, memory, and storage available at the second information handling system 320 than at the first information handling system 330, but more memory and more storage than at smart dock 340. In another example, the second information handling system 320 may be given a rank of one out of three for current hardware resource availability in comparison to the first information handling system 330 and the smart dock 340 due to a higher currently available number of CPUs, cores, threads, memory, storage, and battery power available at the second information handling system 320 than at the first information handling system 330, or at smart dock 340. In yet another example, the second information handling system 320 may be given a rank of two out of three for the function interface availability because it has been designated as available for implementation of firmware or software updates for each of the peripheral devices 391, 392, 393, 394, and 395 in the peripheral device workspace 350, but is not designated as available for implementation of peripheral device operational configuration policies at any of the peripheral devices 391, 392, 393, 394, or 395. Code instructions for the adaptive peripheral device workspace node update and configuration task ownership module 386 in an embodiment may operate to add each of these ranks together to provide a total ranking of five out of a best value of three and a worst possible value of nine for the second information handling system 320.

In still another example embodiment, the smart dock 340 may be given a rank of three out of three for maximum or best hardware resource availability in comparison to the first information handling system 330 and the second information handling system 320 due to a lower maximum memory, and storage available at the smart dock 340 than at the first or second information handling systems 330 or 320. In another example, the smart dock 340 may be given a rank of three out of three for current hardware resource availability in comparison to the first information handling system 330 and the second information handling system 320 due to a lower currently available memory, or storage, than that available at the first information handling system 330 or at the second information handling system 320. In yet another example, the smart dock 340 may be given a rank of three out of three for the function interface availability because it has not been designated as available for implementation of firmware or software updates but it has been designated as available for implementation of peripheral device operational configuration policies at a portion of the peripheral devices 393, 394, or 395 within the peripheral device workspace 350. Code instructions for the adaptive peripheral device workspace node update and configuration task ownership module 386 in an embodiment may operate to add each of these ranks together to provide a total ranking of nine out of a best value of three and a worst possible value of nine for the smart dock 340.

Code instructions for the adaptive peripheral device workspace node update and configuration task ownership module 386 in an embodiment may then execute to rank each of the smart nodes 320, 330 and 340 within the given peripheral device workspace 350 from first to last choice to execute firmware or software updates and institute peripheral device configuration policies across the peripheral devices within the peripheral device workspace. In some cases, the ranking of smart nodes 320, 330, or 340 selected to execute firmware or software updates for all peripheral devices within the peripheral device workspace 350 may be separate and distinct from the ranking of smart nodes 320, 330, or 340 selected to execute updates to configuration policies for each of the peripheral devices 391, 392, 393, 394, or 395 within the peripheral device workspace 350. Additionally, such a ranking or designation for control of firmware or software updates or configuration policy updates may depend upon availability for such control, as described within the function interface availability for each smart node 320, 330, or 340.

For example, as shown in the first column on the right of Table 1, the first information handling system 330 may be designated as the primary owner for implementation of both firmware or software updates and peripheral device operational configuration policies at each of the peripheral devices 391, 392, 393, 394, and 395 due to its highest rank (four out of nine), and its availability within its associated function interface availability designation for ownership of firmware and configuration policies update tasks. In another example, the second information handling system 320 may be designated as the secondary owner for implementation of firmware or software updates at each of the peripheral devices 391, 392, 393, 394, and 395 due to its second-highest rank (five out of nine), and its availability within its associated function interface availability designation for ownership of firmware update tasks. However, despite the second information handling system 320 having a second-highest rank in such an embodiment, the second information handling system 320 may not be listed as a secondary owner for implementation of peripheral device operational configuration policies due to its lack of availability for such ownership, as given within its associated function interface availability designation. In yet another example embodiment, the smart dock 340 may be designated as the tertiary owner for implementation of peripheral device operational configuration policies at a portion of the peripheral devices 393, 394, and 395 due to its lowest rank (nine out of nine), and its availability within its associated function interface availability designation for ownership of peripheral device operational configuration policy update tasks for peripheral devices 393, 394, and 395. However, despite that the smart dock 340 may not be listed as a tertiary owner for implementation of peripheral device operational configuration policies for peripheral devices 391 and 392 due to its lack of availability for such ownership, as given within its associated function interface availability designation.

Code instructions for the adaptive peripheral device workspace node update and configuration task ownership module may then execute in an embodiment to determine whether a defined trigger for control ownership reevaluation has been detected within the most recently received peripheral device workspace anchor node status update document. The adaptive peripheral device workspace node update and configuration task ownership module 386 in embodiments may periodically receive peripheral device workspace anchor node status update documents describing the current hardware component usage or utilization levels, battery remaining, and identification of newly added or recently removed nodes, for example. Code instructions for the adaptive peripheral device workspace node update and configuration task ownership module 386 may execute to re-delegate update tasks across smart nodes 320, 330, and 340 for the peripheral device workspace 350 in an embodiment if a recently received peripheral device workspace anchor node status update document contains one or more triggers. For example, such triggers may include an identification that a usage metric for resource utilization levels for a hardware component such as a CPU, memory, storage device, or network interface device exceeds a threshold value (e.g., 90%) for one or more of the smart nodes 320, 330, or 340 within the peripheral device workspace identified as capable of update ownership. Other example triggers may include low battery power remaining or entry or removal of a smart node 320, 330, or 340 within the peripheral device workspace 350.

In an embodiment in which a defined trigger for control ownership reevaluation has been detected within the most recently received peripheral device workspace anchor node status update document, code instructions for the adaptive peripheral device workspace node update and configuration task ownership module 386 may execute to identify or designate a best smart node 320, 330, or 340 for execution of update tasks relating to firmware or software and peripheral device operational configuration policies. Such a determination may be made in an embodiment based on previously determined rankings for each of the smart nodes 320, 330, or 340 within a given peripheral device workspace from first to last choice to execute firmware or software updates and institute peripheral device configuration policies across the secondary node peripheral devices 391, 392, 393, 394, and 395 within the peripheral device workspace 350. In an embodiment, such a determination may also depend upon the triggering event identified above. For example, if the triggering event identified above indicates heavy workload at the first information handling system 330, the first information handling system 330 may be removed from consideration of update tasks or configuration tasks that may be delegated away from the first information handling system 330 and toward the other smart nodes 320 and 340.

Upon identification of one of these triggers in embodiments described herein, code instructions for the adaptive peripheral device workspace node update and configuration task ownership module 386 may execute to reevaluate which smart node 320 or 340 should be assigned as the anchor node for any one of the peripheral devices 391, 392, 393, 394, or 395 and for which type of update task. As described directly above, in the case where the trigger identified above involves an identification of low availability of a hardware component (e.g., CPU, memory, storage device, network interface device, battery) for a given smart node such as information handling system node 330 within the peripheral device workspace 350, the information handling system node 330 may be de-designated as the anchor node for any update tasks that can be delegated elsewhere. Code instructions for the adaptive peripheral device workspace node update and configuration task ownership module 386 may execute to identify a best anchor node that is a next option for implementation of firmware or software updates across the current peripheral device workspace 350, based on the previously determined rankings for each of the smart nodes 320, 330, and 340. For example, code instructions for the adaptive peripheral device workspace node update and configuration task ownership module 386 may execute to identify, with reference to the update execution ownership role table, such as Table 1 above, that the second information handling system 320 is designated as a secondary owner for all firmware or software update execution tasks across each of the peripheral devices 391, 392, 393, 394, and 395. In such an embodiment, code instructions for the adaptive peripheral device workspace node update and configuration task ownership module 386 may execute to instruct the second information handling system 320 to take control of all firmware or software update tasks for each of the peripheral devices 391, 392, 393, 394, and 395.

Code instructions for the adaptive peripheral device workspace node update and configuration task ownership module 386 may execute to identify a best anchor node that is next for implementation of configuration policy updates across the current peripheral device workspace 350, based on the previously determined rankings for each of the smart nodes 320, 330, and 340. For example, code instructions for the adaptive peripheral device workspace node update and configuration task ownership module 386 may execute to identify, with reference to the update execution ownership role table, such as the example Table 1 above, that the smart dock 340 is designated as a secondary owner for all configuration policy update execution tasks across a portion of the peripheral devices, such as 393, 394, and 395 in an example embodiment. In such an embodiment, code instructions for the adaptive peripheral device workspace node update and configuration task ownership module 386 may execute to instruct the smart dock 340 to take control of all firmware update tasks for each of the peripheral devices 393, 394, and 395. This may leave the first information handling system 330 in control of configuration policy update execution tasks for the peripheral devices 391 and 392, as the smart dock 340 is not available for configuration of those devices.

Such a determination of delegation of these various update tasks may take into account, in some cases, the removal of one or more smart nodes 330, 320, or 340 from the workspace 350. For example, if any one of the smart nodes 320, 330, or 340 are removed from the workspace 350, as reflected within an updated manifest, the removed node 320, 330, or 340 may be removed from consideration as an anchor node for any update tasks or for any peripheral devices 391, 392, 393, 394, or 395, regardless of rank.

In an embodiment, code instructions for the adaptive peripheral device workspace node update and configuration task ownership module may then execute to transmit updated peripheral device operational configuration policies or firmware or software updates for the peripheral devices within the peripheral device workspace for implementation via the selected anchor node as instructed for that update or configuration task. For example, code instructions for the adaptive peripheral device workspace node update and configuration task ownership module 386 in an embodiment may be executed to transmit any future or updated peripheral device operational configuration policies for peripheral devices 391 or 392 to the first information handling system 330 in the peripheral device workspace 350 for implementation at the peripheral devices 391 and 392. In another example, code instructions for the adaptive peripheral device workspace node update and configuration task ownership module 386 in an embodiment may be executed to transmit any future or updated peripheral device operational configuration policies for peripheral devices 393, 394, or 395 to the smart dock 340 in the peripheral device workspace 350 for implementation at the peripheral devices 393, 394, and 395. In still another example embodiment, code instructions for the adaptive peripheral device workspace node update and configuration task ownership module 386 may be executed to transmit any future firmware or software updates for peripheral devices 391, 392, 393, 394, or 395 to the second information handling system 320 in the peripheral device workspace 350 for implementation at the peripheral devices 391, 392, 393, 394, and 395. In such a way, frequent update tasks may be delegated away from an information handling system anchor node for a peripheral device workspace currently undergoing a high workload and toward under-utilized information handling systems or smart peripheral devices, defined within the peripheral device workspace as capable of such task execution.

Figure 4:
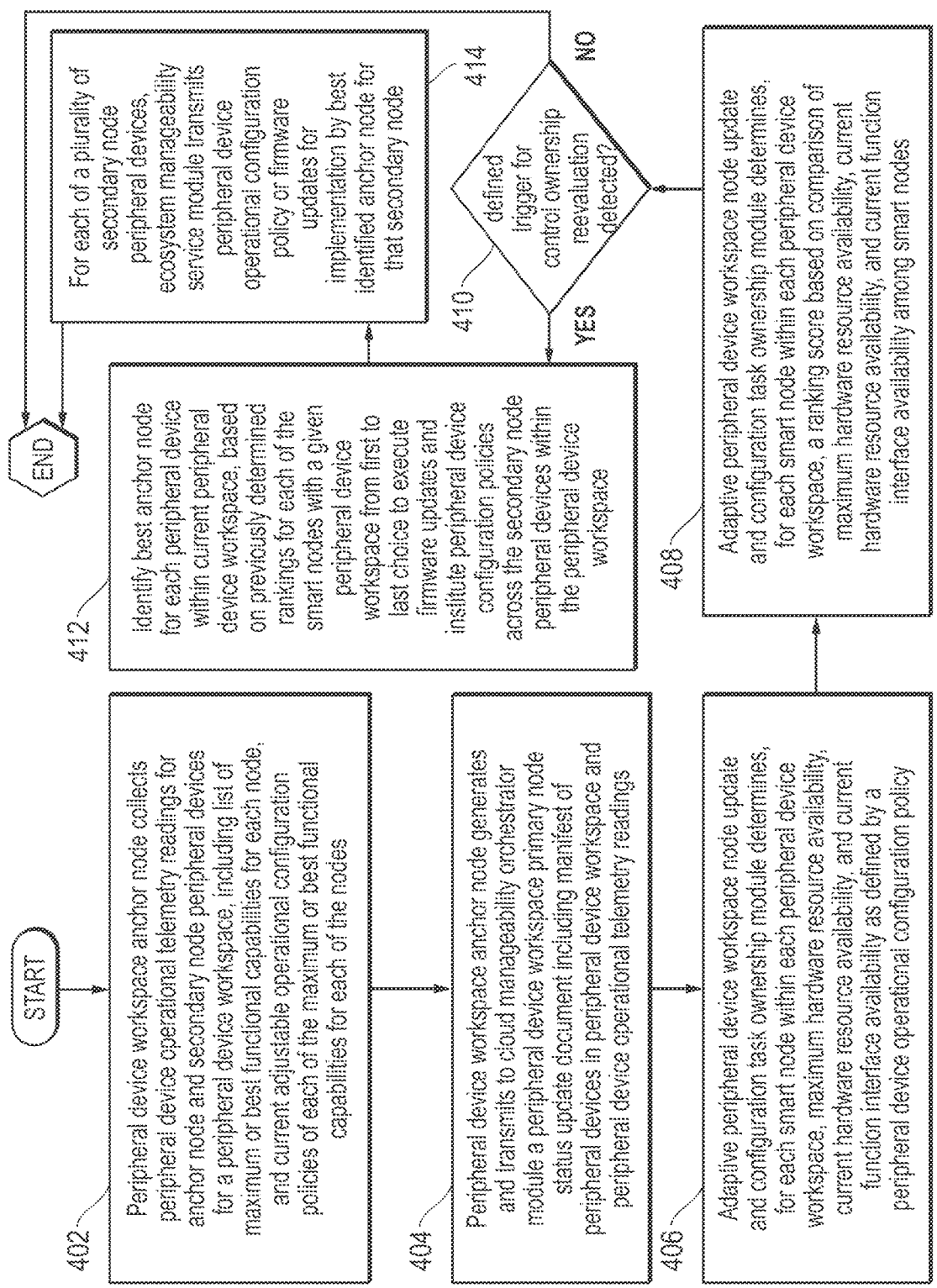
FIG. 4 is a flow diagram illustrating a method of executing code instructions of one or more software modules of a peripheral device workspace cloud orchestrator for distributing ownership of firmware or software updates and peripheral device operational configuration policy application execution across a plurality of smart peripheral device nodes and anchor information handling system nodes in a peripheral device workspace according to an embodiment of the present disclosure.

FIG. 4 is a flow diagram illustrating a method of executing code instructions for the adaptive peripheral device workspace node update and configuration task ownership module for distributing ownership of firmware or software updates and peripheral device operational configuration policy application execution across a plurality of smart peripheral devices and information handling systems according to an embodiment of the present disclosure. As described herein, peripheral device workspaces that include a plurality of information handling systems or one or more smart peripheral devices having some compute and network capabilities may be capable of delegating some of these frequent update tasks away from information handling systems undergoing high workloads and toward under-utilized information handling systems or smart peripheral devices, defined within the peripheral device workspace as capable of such task execution.

At block 402, a first peripheral device workspace anchor node in an embodiment may collect peripheral device operational telemetry readings for the anchor node and secondary node peripheral devices for a peripheral device workspace. This may include a list of hardware resource availability metrics including best or maximum capabilities and current hardware resource availability metrics for each node in the peripheral device workspace, and current adjustable operational configuration of each of the existing functional capabilities for each of the nodes in the peripheral device workspace, where and when communication and retrieval of such peripheral device operational telemetry readings is available. For example, as described in an embodiment with respect to FIG. 1, peripheral device operational telemetry readings gathered pursuant to execution of code instructions for an ecosystem manageability sub-agent 172 in an embodiment may include, for example, information specific to the information handling system 100, or the operative connection between the information handling system 100 and the peripheral devices 142 when in one or another peripheral device workspace. More specifically, the peripheral device operational and environmental context telemetry readings gathered pursuant to execution of code instructions for the ecosystem manageability sub-agent may include, for the information handling system 100, a current power mode (e.g., sleep mode, battery mode, operational mode, powered down), range of possible power modes, current time, geographic location for the peripheral device workspace that includes the information handling system 100, current execution of a specific software application, hardware processor 102 or 104 utilization rate, memory 106, 108, or 120 utilization rate, wireless interface device 178, wired network interface device utilization rate, or remaining battery power for battery 124. In another example embodiment, the peripheral device operational telemetry readings gathered pursuant to execution of code instructions for the ecosystem manageability sub-agent 172 may include measured values for the wired or wireless link operatively coupling the one or more of the peripheral devices 142 to the information handling system 100, such as throughput metric, received signal strength indicator (RSSI), wireless protocol (e.g., WLAN, WWAN, WPAN, Bluetooth®, BLE), or measured number of dropped packets.

In another example embodiment described with respect to FIG. 2, code instructions for the ecosystem manageability sub-agent 290 in an embodiment may execute to gather, via ecosystem manageability interfaces 252 and 256 at one or more secondary node peripheral devices 251 and 255, respectively, various peripheral device operational telemetry readings describing operational capabilities for the one or more secondary node peripheral devices 251 and 255, respectively, within the peripheral device workspace 250, as well as adjustable operational configurations for those operational capabilities. A similar method of gathering telemetry for a smart peripheral device 240 may also be performed via the ecosystem manageability sub-agent 290 in an embodiment. For example, the ecosystem manageability sub-agent 290 in an embodiment may gather, via ecosystem manageability sub-agent 241, various peripheral device operational telemetry data readings describing adjustable configurations for the smart node 240 within the peripheral device workspace 250. In addition, the ecosystem manageability sub-agent 241 for the smart node 240 in an embodiment in which the smart node 240 acts an anchor node for the peripheral device workspace 250 may gather, via ecosystem manageability interfaces 252 and 256, respectively, various peripheral device operational telemetry data readings describing adjustable configurations for the secondary node peripheral devices 251 and 255, respectively, within the peripheral device workspace 250.

Code instructions for the ecosystem maintenance sub-agent executing at the anchor node in an embodiment may also execute to retrieve hardware resource availability metrics for the peripheral devices from each of the operatively coupled peripheral devices in the peripheral device workspace. For example, code instructions for the ecosystem manageability sub-agent 290 of the anchor node information handling system 230 may execute in an embodiment to retrieve the hardware resource availability metrics for the peripheral devices 251, and 255 from the firmware 253, or 257, respectively, or from ODD services 254, and 258, respectively, via communication with the ecosystem manageability interfaces 252 and 256, which may act as application programming interfaces (APIs), for example, between the firmware 253, or 257, respectively, or the ODD services 254, and 258, respectively, and the ecosystem manageability sub-agent 290. With respect to smart node 240, code instructions for the ecosystem manageability sub-agent 290 in an embodiment may execute to retrieve the hardware resource availability metrics for the smart node 240 from the firmware 246, or from ODD services 244, via communication with the ecosystem manageability sub-agent 241 which may also act as an API, for example, between the firmware 246, or the ODD services 244, and the ecosystem manageability sub-agent 290. Code instructions for the ecosystem manageability sub-agent 241 of the smart node 240 may also be capable, in an embodiment in which the smart node 240 acts as an anchor node, of executing to retrieve the hardware resource availability metrics for the peripheral devices 251, and 255 from the firmware 253, or 257, respectively, or from ODD services 254, and 258, respectively, and for the information handling system 230 from firmware 232 and 231. The ecosystem manageability sub-agent 290 in an embodiment may execute code instructions to gather this information from the various ecosystem manageability interfaces 252 and 256, and ecosystem manageability sub-agents 290 and 241, for example, upon each detection of operative coupling of the peripheral devices 251 and 255, or smart node 240, respectively, with the anchor node information handling system 230, or upon an initial pairing.

The peripheral device workspace anchor node in an embodiment at block 404 may generate and transmit to the cloud manageability orchestrator module executing at a peripheral device workspace cloud orchestrator server a peripheral device workspace anchor node status update document including a manifest of peripheral devices in the peripheral device workspace and collected peripheral device operational telemetry readings for a peripheral device workspace location identified by a location identifier. For example, in an embodiment described with respect to FIG. 1, code instructions for the ecosystem manageability sub-agent 172 executing at the information handling system 100 in a peripheral device workspace may create a manifest of peripheral device nodes 142 and other nodes for a peripheral device workspace identification value to represent the current peripheral device workspace (e.g., 250 or 260 in FIG. 2), including an identification of the location, and an identification (e.g., by product serial number or other peripheral device identification) of each of the peripheral device nodes 142 connected to or operably coupled to the anchor information handling system 100 at a peripheral device workspace.

The hardware processor 102 of the user anchor information handling system 100 may execute code instructions of the ecosystem manageability sub-agent 172 to also collect one or more peripheral device operational telemetry readings (e.g., time, applications executing, hardware component usage metrics, maximum or best functional capabilities for one or more hardware components, or other telemetry data indicating usage patterns for the information handling system 100 or various peripheral devices 142 in a peripheral device workspace). The manifest of peripheral device nodes and other nodes as well as location of a peripheral device workspace described above may be combined with the peripheral device operational telemetry readings for the peripheral device workspace and an identification of the anchor node information handling system 100 user into a peripheral device workspace anchor node status update document written in a machine-readable language or machine markup language such as JavaScript Object Notation (JSON), for example, to be associated with a peripheral device workspace identification value.

This peripheral device workspace anchor node status update document is transmitted for storage with the peripheral device workspace identification value at a peripheral device workspace management system database 167 operating in the peripheral device workspace cloud orchestrator 156 executing at the peripheral device workspace cloud orchestrator server 158. Each time a peripheral device configuration setting is changed by the user, a new peripheral device is added to the peripheral device workspace, or changes to environmental context data for the peripheral device workspace are detected, a new peripheral device workspace anchor node status update document including this updated configuration may be transmitted to the peripheral device workspace cloud orchestrator 156 for association with the peripheral device workspace identification value for the peripheral device workspace. Additionally, values for the ODD of each peripheral device in the manifest of peripheral devices in the peripheral device workspace may also be updated with these changes.

At block 406, code instructions for an adaptive peripheral device workspace node update and configuration task ownership module may execute at a peripheral device workspace cloud orchestrator server to determine, for each smart node within each peripheral device workspace, maximum hardware resource availability, current hardware resource availability, and current function interface availability, as defined by an internet technology decision maker (ITDM) for an enterprise. For example, in an embodiment described with reference to FIG. 3, peripheral device operational telemetry readings for the peripheral device workspace 350, as stored at the peripheral device workspace management system database 387 may include Orchestrated Device Descriptors (ODDs) defining hardware resource availability metrics, including best or maximum values in some examples, for the nodes 320, 330, 340, 391, 392, 393, 394, and 395. More specifically, code instructions for an adaptive peripheral device workspace node update and configuration task ownership module may execute at the peripheral device workspace cloud orchestrator server to retrieve such ODDs which may indicate that the first anchor node information handling system 330 has a maximum of two available central processing units (CPUs), a maximum of 16 available CPU cores, a maximum of 32 available threads, a maximum available memory of 8 GB, and a maximum available storage of 512 GB. In another example, code instructions for an adaptive peripheral device workspace node update and configuration task ownership module may execute to retrieve such ODDs which may indicate that a secondary node information handling system 320 has a maximum of one available CPU, a maximum of 8 available CPU cores, a maximum of 16 available threads, a maximum available memory of 8 GB, and a maximum available storage of 256 GB. In yet another example, code instructions for an adaptive peripheral device workspace node update and configuration task ownership module may execute to retrieve such ODDs which may indicate that a secondary node smart dock 340 has a maximum of one available CPU, a maximum available memory of 2 MB, and a maximum available storage of 256 MB.

Peripheral device operational telemetry readings in an embodiment may also include current hardware resource availability metrics for each node 320, 330, 340, 391, 392, 393, 394, or 395 within the peripheral device workspace 350 retrieved by the adaptive peripheral device workspace node update and configuration task ownership module executing at the peripheral device workspace cloud orchestrator server. For example, code instructions for an adaptive peripheral device workspace node update and configuration task ownership module may execute to retrieve peripheral device operational telemetry readings for the first anchor node information handling system 330, as stored at the peripheral device workspace management system database 387, which may indicate that the first anchor node information handling system 330 currently has only one available CPU, only four CPU cores are currently available, only 16 threads are currently available, only 3 GB of memory are currently available, only 125 GB of storage are currently available, and only 20% of battery power is remaining. As another example, code instructions for an adaptive peripheral device workspace node update and configuration task ownership module may execute to retrieve peripheral device operational telemetry readings for the peripheral device information handling system 320 indicating that the information handling system 320 currently has one available CPU, eight CPU cores are currently available, 16 threads are currently available, 8 GB of memory are currently available, 256 GB of storage are currently available, and 80% of battery power is remaining. In yet another example, code instructions for an adaptive peripheral device workspace node update and configuration task ownership module may execute to retrieve peripheral device operational telemetry readings for the smart dock 340 indicating that the smart dock 340 currently has one available CPU, available memory of 2 MB, and available storage of 256 MB.

Code instructions for an adaptive peripheral device workspace node update and configuration task ownership module may also execute at the peripheral device workspace cloud orchestrator server to determine, for each smart node within each peripheral device workspace, current function interface availability, as defined by or modified by an internet technology decision maker (ITDM) for an enterprise. For example, in an embodiment described with reference to FIG. 1, an ITDM may use the peripheral device workspace cloud orchestrator console 160 to indicate availability for each of the smart nodes, such as a smart peripheral device or secondary information handling system within a peripheral device workspace to execute or implement received peripheral device operational configuration policies among one or more operatively coupled peripheral devices. In some cases, the adaptive peripheral device workspace node update and configuration task ownership module executing at the peripheral device workspace cloud orchestrator server in an embodiment may make such a determination based on ability of the smart peripheral device or secondary information handling system to operatively couple with any given peripheral device 142 within the peripheral device workspace. For example, a smart peripheral device or secondary information handling system for the peripheral device workspace may not be capable of operative coupling with one or more of the peripheral devices 142 due to incompatible ports or communication protocols. Such compatibility information for the smart peripheral device, secondary information handling system, or various peripheral devices may be taken from the orchestrated device designator (ODD) for each of these devices, as stored within the peripheral device workspace management system database 167. In various other embodiments, code instructions for the adaptive peripheral device workspace node update and configuration task ownership module may execute to receive modifications or selections of availability provided by the ITDM. In effect, the code instructions executed for the adaptive peripheral device workspace node update and configuration task ownership module may define, within a pre-stored function interface availability for each of the information handling systems (e.g., including 100) and all smart nodes within a given peripheral device workspace, availability to implement peripheral device operational configuration policies at each of a plurality of peripheral devices for that peripheral device workspace.

In another example embodiment described with reference to FIG. 3, executed code instructions for the adaptive peripheral device workspace node update and configuration task ownership module 386 may indicate availability for each of the smart nodes 320, 330, and 340, within a peripheral device workspace 350 to execute or implement received peripheral device operational configuration policies among one or more operatively coupled peripheral devices 391, 392, 393, 394, and 395. In some cases, such a determination may be made based on ability of the smart peripheral device 320, 330, or 340 to operatively couple with any given peripheral device 391, 392, 393, 394, or 395 within the peripheral device workspace 350. For example, the smart peripheral device 340 for the peripheral device workspace 350 may not be capable of operative coupling with one or more of the peripheral devices 391 or 392 due to incompatible ports or communication protocols. Such compatibility information for the smart peripheral devices 320, 330, and 340, and various peripheral devices 391, 392, 393, 394, and 395 may be taken from the orchestrated device designator (ODD) for each of these devices, as stored within the peripheral device workspace management system database 387.

In effect, the code instructions executed for the adaptive peripheral device workspace node update and configuration task ownership module 386 may define, within a pre-stored function interface availability for each of the smart nodes 320, 330, and 340 within a given peripheral device workspace 350, availability to implement peripheral device operational configuration policies at each of a plurality of peripheral devices 391, 392, 393, 394, or 395 for that peripheral device workspace. More specifically, the pre-stored function interface availability for the first information handling system 330 may indicate that is available to configure each of the peripheral devices 391, 392, 393, 394, and 395. In another example, the pre-stored function interface availability for the second information handling system 320 may indicate that is not available to configure any of the peripheral devices 391, 392, 393, 394, or 395. In yet another example, the pre-stored function interface availability for the smart dock 340 may indicate that is available to configure each of the peripheral devices 393, 394, and 395.

At block 408, code instructions for the adaptive peripheral device workspace node update and configuration task ownership module may execute in an embodiment to determine, for each smart node, including information handling system nodes such as laptops, within each peripheral device workspace, a ranking score based on comparison of maximum hardware resource availability, current hardware resource availability, and current function interface availability among smart nodes. For example, as shown in example Table 1, code instructions for the adaptive peripheral device workspace node update and configuration task ownership module may execute to list, such as in the second, third, and fourth columns from the left in Table 1, for each smart node 320, 330, and 340 within the peripheral device workspace 350, the best or maximum hardware resource availability, current hardware resource availability, and pre-defined function interface availability, as determined and described in embodiments herein. The maximum hardware resource availability and current hardware resource availability in an embodiment may include metrics for various hardware components of each smart node 320, 330, and 340, including hardware processors (CPUs, GPUs, VPUs, etc.), memory, storage, network connectivity resources, node to node connectivity resources, or batteries, for example. Code instructions for the adaptive peripheral device workspace node update and configuration task ownership module 386 in an embodiment may execute to determine a peripheral device update task delegation ranking score, for example given in the fifth column from the left in the example Table 1 above, for each smart node 320, 330, and 340. These peripheral device update task delegation ranking scores for each smart node 320, 330, or 340 may be used to adaptively shift update tasks for firmware and peripheral device configurations to the most capable and least utilized smart node 320, 330, or 340 within the peripheral device workspace 350 as peripheral device operational telemetry readings change.

More specifically, the first information handling system 330 may be given a rank of one out of three for maximum or best hardware resource availability in comparison to the second information handling system 320 and the smart dock 340 due to a higher maximum number of CPUs, cores, threads, memory, and storage available at the first information handling system 330 than at either of the second information handling system 320 or smart dock 340. In another example, the first information handling system 330 may be given a rank of two out of three for current hardware resource availability in comparison to the second information handling system 320 and the smart dock 340 since the first information handling system 330 currently has available fewer cores, fewer threads, less memory, less storage, and less battery power than the second information handling system 320, but more memory and more storage than the smart dock 340. In yet another example, the first information handling system 330 may be given a rank of one out of three for the function interface availability because it has been designated as available for both implementation of firmware or software updates and implementation of peripheral device operational configuration policies for each of the peripheral devices 391, 392, 393, 394, and 395 in the peripheral device workspace. Code instructions for the adaptive peripheral device workspace node update and configuration task ownership module 386 in an embodiment may operate to add each of these ranks together to provide a total ranking of four out of a best value of three and a worst possible value of nine for the first information handling system 330.

In another example embodiment, the second information handling system 320 may be given a rank of two out of three for maximum or best hardware resource availability in comparison to the first information handling system 330 and the smart dock 340 due to a lower maximum number of CPUs, cores, threads, memory, and storage available at the second information handling system 320 than at the first information handling system 330, but more memory and more storage than at smart dock 340. In another example, the second information handling system 320 may be given a rank of one out of three for current hardware resource availability in comparison to the first information handling system 330 and the smart dock 340 due to a higher currently available number of CPUs, cores, threads, memory, storage, and battery power available at the second information handling system 320 than at the first information handling system 330, or at smart dock 340. In yet another example, the second information handling system 320 may be given a rank of two out of three for the function interface availability because it has been designated as available for implementation of firmware or software updates for each of the peripheral devices 391, 392, 393, 394, and 395 in the peripheral device workspace 350, but is not designated as available for implementation of peripheral device operational configuration policies at any of the peripheral devices 391, 392, 393, 394, or 395. Code instructions for the adaptive peripheral device workspace node update and configuration task ownership module 386 in an embodiment may operate to add each of these ranks together to provide a total ranking of five out of a best value of three and a worst possible value of nine for the second information handling system 320.

In still another example embodiment, the smart dock 340 may be given a rank of three out of three for maximum or best hardware resource availability in comparison to the first information handling system 330 and the second information handling system 320 due to a lower maximum memory, and storage available at the smart dock 340 than at the first or second information handling systems 330 or 320. In another example, the smart dock 340 may be given a rank of three out of three for current hardware resource availability in comparison to the first information handling system 330 and the second information handling system 320 due to a lower currently available memory, or storage, than that available at the first information handling system 330 or at the second information handling system 320. In yet another example, the smart dock 340 may be given a rank of three out of three for the function interface availability because it has not been designated as available for implementation of firmware or software updates but it has been designated as available for implementation of peripheral device operational configuration policies at a portion of the peripheral devices 393, 394, or 395 within the peripheral device workspace 350. Code instructions for the adaptive peripheral device workspace node update and configuration task ownership module 386 in an embodiment may operate to add each of these ranks together to provide a total ranking of nine out of a best value of three and a worst possible value of nine for the smart dock 340.

Code instructions for the adaptive peripheral device workspace node update and configuration task ownership module 386 in an embodiment may then execute to rank each of the smart nodes 320, 330 and 340 within the given peripheral device workspace 350 from first to last choice to execute firmware or software updates and institute peripheral device configuration policies across the peripheral devices within the peripheral device workspace. For example, as shown in the first column on the right of example Table 1, the first information handling system 330 may be designated as the primary owner for implementation of both firmware or software updates and peripheral device operational configuration policies at each of the peripheral devices 391, 392, 393, 394, and 395 due to its highest rank (four out of nine), and its availability within its associated function interface availability designation for ownership of firmware and configuration policies update tasks. In another example, the second information handling system 320 may be designated as the secondary owner for implementation of firmware or software updates at each of the peripheral devices 391, 392, 393, 394, and 395 due to its second-highest rank (five out of nine), and its availability within its associated function interface availability designation for ownership of firmware update tasks. However, despite the second information handling system 320 having a second-highest rank in such an embodiment, the second information handling system 320 may not be listed as a secondary owner for implementation of peripheral device operational configuration policies due to its lack of availability for such ownership, as given within its associated function interface availability designation. In yet another example embodiment, the smart dock 340 may be designated as the tertiary owner for implementation of peripheral device operational configuration policies at a portion of the peripheral devices 393, 394, and 395 due to its lowest rank (nine out of nine), and its availability within its associated function interface availability designation for ownership of peripheral device operational configuration policy update tasks for peripheral devices 393, 394, and 395. However, despite the smart dock 340 may not be listed as a tertiary owner for implementation of peripheral device operational configuration policies for peripheral devices 391 and 392 due to its lack of availability for such ownership, as given within its associated function interface availability designation.

Code instructions for the adaptive peripheral device workspace node update and configuration task ownership module may execute at the peripheral device workspace cloud orchestrator server in an embodiment at block 410 to determine whether a defined trigger for control ownership reevaluation has been detected within the most recently received peripheral device workspace anchor node status update document. The adaptive peripheral device workspace node update and configuration task ownership module 386 in embodiments may periodically receive peripheral device workspace anchor node status update documents describing the current hardware component usage, battery remaining, and identification of newly added or recently removed nodes, for example. Code instructions for the adaptive peripheral device workspace node update and configuration task ownership module 386 may execute to re-delegate update tasks across smart nodes 320, 330, and 340 for the peripheral device workspace 350 in an embodiment if a recently received peripheral device workspace anchor node status update document contains one or more triggers. For example, such triggers may include an identification that a usage metric for a hardware component such as a CPU, memory, storage device, or a network interface device exceeds a threshold value (e.g., 90%) for one or more of the smart nodes 320, 330, or 340 within the peripheral device workspace identified by the ITDM as capable of update ownership. Other example triggers may include low battery power remaining or entry or removal of a smart node 320, 330, or 340 within the peripheral device workspace 350.

If a trigger is detected, this may indicate a need to redistribute update tasks for firmware or peripheral device operational configuration policies among various smart nodes currently undergoing lighter workloads, and the method may proceed to block 412 for such a redistribution. If such a trigger is not detected, there may be no need to shift the execution of update tasks away from a currently designated anchor node for that task, and the method may then end.

At block 412, in an embodiment in which a defined trigger for control ownership reevaluation has been detected within the most recently received peripheral device workspace anchor node status update document, code instructions for the adaptive peripheral device workspace node update and configuration task ownership module may execute to identify or designate a best smart node for execution of update tasks relating to firmware or software and peripheral device operational configuration policies. Such a determination may be made in an embodiment based on previously determined rankings for each of the smart nodes within a given peripheral device workspace from first to last choice to execute firmware or software updates and institute peripheral device configuration policies across the secondary node peripheral devices within the peripheral device workspace. In an embodiment, such a determination may also depend upon the triggering event identified at block 410. For example, if the triggering event identified at block 410 indicates heavy workload at the first information handling system 330, the first information handling system 330 may be removed from consideration of update tasks that may be delegated away from the first information handling system 330 and toward the other smart nodes 320 and 340.

Upon identification of one of these triggers in embodiments described herein, code instructions for the adaptive peripheral device workspace node update and configuration task ownership module 386 may execute to reevaluate which smart node 320 or 340 should be assigned as the anchor node for any one of the peripheral devices 391, 392, 393, 394, or 395 and for which type of update task. As described directly above, in the case where the trigger identified above involves an identification of low availability of a hardware component (e.g., CPU, memory, storage device, network interface device, battery) for a given smart node 330 within the peripheral device workspace 350, that smart node 330 may be de-designated as the anchor node for any update tasks that can be delegated elsewhere. Code instructions for the adaptive peripheral device workspace node update and configuration task ownership module 386 may execute to identify a best anchor node for implementation of firmware or software updates across the current peripheral device workspace 350, based on the previously determined rankings for each of the smart nodes 320, 330, and 340. For example, code instructions for the adaptive peripheral device workspace node update and configuration task ownership module 386 may execute to identify, with reference to the update execution ownership role table, such as Table 1 above, that the second information handling system 320 is designated as a secondary owner for all firmware update execution tasks across each of the peripheral devices 391, 392, 393, 394, and 395. In such an embodiment, code instructions for the adaptive peripheral device workspace node update and configuration task ownership module 386 may execute to instruct the second information handling system 320 to take control of all firmware update tasks for each of the peripheral devices 391, 392, 393, 394, and 395.

Code instructions for the adaptive peripheral device workspace node update and configuration task ownership module 386 may execute to identify a best anchor node for implementation of configuration policy updates across the current peripheral device workspace 350, based on the previously determined rankings for each of the smart nodes 320, 330, and 340. For example, code instructions for the adaptive peripheral device workspace node update and configuration task ownership module 386 may execute to identify, with reference to the update execution ownership role table, such as Table 1 above, that the smart dock 340 is designated as a secondary owner for all configuration policy update execution tasks across a portion of the peripheral devices, such as 393, 394, and 395. In such an embodiment, code instructions for the adaptive peripheral device workspace node update and configuration task ownership module 386 may execute to instruct the smart dock 340 to take control of all firmware update tasks for each of the peripheral devices 393, 394, and 395. This may leave the first information handling system 330 in control of configuration policy update execution tasks for the peripheral devices 391 and 392, as the smart dock 340 is not available for configuration of those devices.

Such a determination of delegation of these various update tasks may take into account, in some cases, the removal of one or more smart nodes 330, 320, or 340 from the workspace 350. For example, if any one of the smart nodes 320, 330, or 340 are removed from the workspace 350, as reflected within an updated manifest, the removed node 320, 330, or 340 may be removed from consideration as an anchor node for any update tasks or for any peripheral devices 391, 392, 393, 394, or 395, regardless of rank.

In an embodiment at block 414, code instructions for the adaptive peripheral device workspace node update and configuration task ownership module may execute to transmit updated peripheral device operational configuration policies or firmware or software updates for the peripheral devices within the peripheral device workspace for implementation via the selected anchor node for that update task. For example, code instructions for the adaptive peripheral device workspace node update and configuration task ownership module 386 in an embodiment may be executed to transmit any future or updated peripheral device operational configuration policies for peripheral devices 391 or 392 to the first information handling system 330 in the peripheral device workspace 350 for implementation at the peripheral devices 391 and 392. In another example, code instructions for the adaptive peripheral device workspace node update and configuration task ownership module 386 in an embodiment may be executed to transmit any future or updated peripheral device operational configuration policies for peripheral devices 393, 394, or 395 to the smart dock 340 in the peripheral device workspace 350 for implementation at the peripheral devices 393, 394, and 395. In still another example embodiment, code instructions for the adaptive peripheral device workspace node update and configuration task ownership module 386 may be executed to transmit any future firmware or software updates for peripheral devices 391, 392, 393, 394, or 395 to the second information handling system 320 in the peripheral device workspace 350 for implementation at the peripheral devices 391, 392, 393, 394, and 395.

In such a way, frequent update tasks may be delegated away from an information handling system anchor node for a peripheral device workspace currently undergoing a high workload and toward under-utilized information handling systems or smart peripheral devices, defined within the peripheral device workspace as capable of such task execution. The method for distributing ownership of firmware or software updates and peripheral device operational configuration policy application execution across a plurality of smart peripheral devices and information handling systems may then end.

The blocks of the flow diagrams of FIG. 4 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A peripheral device workspace cloud orchestrator executing at a cloud-based information handling system comprising:

a network interface device to receive a plurality of peripheral device operational telemetry readings, including a maximum hardware resource availability and a current hardware resource availability, for a first user information handling system node operatively coupled to a plurality of device nodes in a peripheral device workspace;

a hardware processor to execute code instructions of the peripheral device workspace cloud orchestrator to manage the peripheral device workspace defined for an identified location with a manifest of device nodes including the first user information handling system node, peripheral device nodes, and including a second information handling system node or a smart peripheral device node that has compute capabilities, where the peripheral device workspace is identified by a peripheral device workspace identification value in a database at the cloud-based information handling system;

the hardware processor to execute code instructions of the peripheral device workspace cloud orchestrator to determine a ranking score for the first user information handling system node and a plurality of other device nodes in the peripheral device workspace, based on the maximum hardware resource availability and the current hardware resource availability for the device nodes;

the hardware processor to execute code instructions to designate one of the second information handling system node or the smart peripheral device node having a highest ranking score as a secondary anchor node for the peripheral device workspace; and the hardware processor to execute code instructions to instruct the secondary anchor node to implement a transmitted peripheral device operational configuration policy or a firmware or software update transmitted from the peripheral device workspace cloud orchestrator at each of the plurality of node devices.

2. The peripheral device workspace cloud orchestrator of claim 1 further comprising:

a hardware processor to execute code instructions to receive the peripheral device operational telemetry readings and determine that an occurrence of a trigger event that triggers redistribution of firmware or software update execution or peripheral device operational configuration policy update execution away from the first information handling system node to the secondary anchor node.

3. The peripheral device workspace cloud orchestrator of claim 1 further comprising:

a hardware processor to execute code instructions to determine that the received peripheral device operational telemetry readings indicate that current hardware resource availability for one or more hardware components of the first information handling system node has exceeded resource utilization threshold level; and the hardware processor to execute code instructions to redistribute firmware or software update execution or peripheral device operational configuration policy update execution away from the first information handling system node to the secondary anchor node.

4. The peripheral device workspace cloud orchestrator of claim 1 further comprising:

the hardware processor to execute code instructions to determine that the secondary anchor node is unavailable for peripheral device operational configuration policy update execution, based on a pre-stored function interface availability indicating lack of connectivity to a node device; and the hardware processor to execute code instructions to instruct another one of the second information handling system or the smart peripheral device not designated as the secondary anchor node to implement the peripheral device operational configuration policy update execution at the node device.

5. The peripheral device workspace cloud orchestrator of claim 1 further comprising:

the hardware processor to execute code instructions to determine that the secondary anchor node is unavailable for peripheral device operational configuration policy update execution, based on a pre-stored function interface availability indicating lack of connectivity to a first node device; and the hardware processor to execute code instructions to instruct the first information handling system node to continue to implement the peripheral device operational configuration policy update execution at the first node device.

6. The peripheral device workspace cloud orchestrator of claim 1, wherein the smart peripheral device node is a smart docking station for the first information handling system node or the second information handling system node.

7. The peripheral device workspace cloud orchestrator of claim 1, wherein the smart peripheral device node is a smart external display device.

8. A method of execute code instructions of the peripheral device workspace cloud orchestrator at a cloud-based information handling system for delegating control ownership for firmware updates and for configuration updates among a plurality of peripheral device workspace nodes comprising:

receiving, via a network interface device, a plurality of peripheral device operational telemetry readings, including a maximum hardware resource availability and a current hardware resource availability for a first user information handling system node operatively coupled to a plurality of node devices within a peripheral device workspace;

executing code instructions of the peripheral device workspace cloud orchestrator, via hardware processor at the cloud-based information handling system, to store a peripheral device workspace identification value at a database identifying the peripheral device workspace and including a manifest of the user information handling system node and the plurality of device nodes including a plurality of peripheral device node and a second information handling system node or a smart peripheral device node that has compute capabilities within the peripheral device workspace at an identified location;

determining, via a hardware processor executing code instructions, a ranking score for the first user information handling system node and for a portion of the plurality of device nodes based on the maximum hardware resource availability and the current hardware resource availability;

designating, via the hardware processor executing code instructions, one of the second information handling system node or the smart peripheral device node having a highest ranking score as a secondary anchor node for the peripheral device workspace;

accessing the database for a secondary node pre-defined function interface availability for the peripheral device workspace;

determining, via a hardware processor executing code instructions, that the secondary anchor node is available for configuration control ownership based on a secondary node pre-defined function interface availability for the secondary anchor node; and transmitting a peripheral device operational configuration policy update execution and instructing the secondary anchor node to implement the peripheral device operational configuration policy update execution at each of the plurality of peripheral device nodes.

9. The method of claim 8 further comprising:

determining, via the hardware processor, that the secondary anchor node is unavailable for configuration control ownership, based on the secondary anchor node pre-defined function interface availability for the secondary anchor node relating to compatibility or connectivity for implementing the peripheral device operational configuration policy update execution; and instructing, via the hardware processor, the first information handling system node to implement the peripheral device operational configuration policy at each of the plurality of peripheral devices in the peripheral device workspace.

10. The method of claim 8 further comprising:

determining, via the hardware processor, that the secondary anchor node is unavailable to implement the peripheral device operational configuration policy update execution based on the secondary node pre-defined function interface availability for the secondary anchor node;

designating, via the hardware processor, one of the second information handling system node or the smart peripheral device node not designated as the secondary anchor node and associated with a tertiary anchor node pre-defined function interface availability indicating availability to implement the peripheral device operational configuration policy update execution; and instructing, via the hardware processor, the tertiary anchor node to implement the peripheral device operational configuration policy at the plurality of peripheral devices in the peripheral device workspace.

11. The method claim 8 further comprising:

determining that the received peripheral device operational telemetry readings indicate that current hardware resource availability for one or more hardware components of the first information handling system node has exceeded resource utilization threshold level; and executing code instructions, via the hardware processor, to redistribute implementation of the peripheral device operational configuration policy update execution away from the first information handling system node to the secondary anchor node.

12. The method claim 8 further comprising:
receiving, via the network interface device, an updated manifest;
determining that the received peripheral device operational telemetry readings indicate that the first information handling system node is not in the updated manifest; and
executing code instructions, via the hardware processor, to redistribute implementation of the peripheral device operational configuration policy update execution away from the first information handling system node to the secondary anchor node.

13. The method of claim 8, wherein the secondary node pre-defined function interface availability includes a designation received from an information technology decision maker (ITDM) for availability of the secondary node for configuration control ownership within the peripheral device workspace to implement the peripheral device operational configuration policy at the plurality of peripheral devices in the peripheral device workspace.

14. The method of claim 8, wherein the smart peripheral device node is a smart docking station for the first information handling system or the second information handling system.

15. A peripheral device workspace cloud orchestrator executing at a cloud-based information handling system comprising:
a network interface device to receive a plurality of peripheral device operational telemetry readings, including a maximum hardware resource availability and a current hardware resource availability, for a first user information handling system node operatively coupled to a plurality of device nodes in a peripheral device workspace;
a hardware processor to execute code instructions of the peripheral device workspace cloud orchestrator to manage the peripheral device workspace defined for an identified location with a manifest of device nodes including the first user information handling system node, peripheral device nodes, and including a second information handling system node or a smart peripheral device node that has compute capabilities, where the peripheral device workspace is identified by a peripheral device workspace identification value in a database at the cloud-based information handling system;
the hardware processor to execute code instructions of the peripheral device workspace cloud orchestrator to determine a ranking score for the first user information handling system node and each of the second information handling system node or the smart peripheral device node, based on the maximum hardware resource availability, the current hardware resource availability, and a pre-defined function interface availability stored in the database for compatibility and connectivity for implementing peripheral device node control ownership for peripheral device peripheral device operational configuration policy updates or firmware updates;
the hardware processor to execute code instructions to determine that the received peripheral device operational telemetry readings indicate occurrence of a trigger event for peripheral device node control ownership reevaluation; and
the hardware processor to execute code instructions to instruct one of the second information handling system node or the smart peripheral device node associated with a highest ranking score to act as a secondary anchor node for the peripheral device workspace to implement the peripheral device operational configuration policy updates or the firmware update at each of the plurality of peripheral device nodes in the peripheral device workspace.

16. The peripheral device workspace cloud orchestrator of claim 15, wherein the trigger event is an indication within the received peripheral device operational telemetry readings that current hardware resource availability for one or more hardware components of the first information handling system node has reached a resource utilization threshold level.

17. The peripheral device workspace cloud orchestrator of claim 15, wherein the trigger event is an indication within received updated peripheral device operational telemetry readings that the first information handling system is not listed within an updated manifest.

18. The peripheral device workspace cloud orchestrator of claim 15, wherein the pre-defined function interface availability includes a designation received from an information technology decision maker (ITDM) for availability of the secondary node for the peripheral device node control ownership within the peripheral device workspace.

19. The peripheral device workspace cloud orchestrator of claim 15 further comprising:
the hardware processor to execute code instructions to determine that the secondary anchor node is unavailable for peripheral device node control ownership to implement the transmitted peripheral device operational configuration policy based on the pre-stored function interface availability; and
the hardware processor to execute code instructions to instruct one of the second information handling system node or the smart peripheral device node not designated as the secondary anchor node to implement the transmitted peripheral device operational configuration policy at each of the plurality of peripheral device nodes.

20. The peripheral device workspace cloud orchestrator of claim 15 further comprising:
the hardware processor to execute code instructions to determine that the secondary anchor node is unavailable for peripheral device node control ownership for implementing firmware updates based on the pre-stored function interface availability; and
the hardware processor to execute code instructions to instruct the first information handling system to implement the transmitted firmware updates at each of the plurality of peripheral device nodes.

* * * * *